(12) United States Patent
Khoshnevisan et al.

(10) Patent No.: US 12,028,883 B2
(45) Date of Patent: Jul. 2, 2024

(54) TECHNIQUES FOR CHANNEL STATE INFORMATION REPORTING

(71) Applicant: QUALCOMM Incorporated, San Diego, CA (US)

(72) Inventors: Mostafa Khoshnevisan, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/462,729

(22) Filed: Aug. 31, 2021

(65) Prior Publication Data

US 2023/0068245 A1 Mar. 2, 2023

(51) Int. Cl.
*H04W 72/23* (2023.01)
*H04L 5/00* (2006.01)
*H04W 72/1263* (2023.01)
*H04W 72/54* (2023.01)

(52) U.S. Cl.
CPC .......... *H04W 72/54* (2023.01); *H04L 5/0051* (2013.01); *H04W 72/1263* (2013.01); *H04W 72/23* (2023.01)

(58) Field of Classification Search
CPC . H04W 72/54; H04W 72/23; H04W 72/1263; H04L 5/0051
USPC ......................................................... 370/329
See application file for complete search history.

(56) References Cited

U.S. PATENT DOCUMENTS

| | | | |
|---|---|---|---|
| 2019/0173554 A1* | 6/2019 | Kwak | H04B 7/06 |
| 2019/0222282 A1* | 7/2019 | Tsai | H04W 72/566 |
| 2021/0013941 A1* | 1/2021 | Sun | H04L 5/0051 |
| 2021/0076243 A1* | 3/2021 | Manolakos | H04L 25/023 |

OTHER PUBLICATIONS

International Search Report and Written Opinion—PCT/US2022/038715—ISA/EPO—dated Nov. 18, 2022 (2106218WO).

* cited by examiner

*Primary Examiner* — Christopher R Crompton
(74) *Attorney, Agent, or Firm* — Holland & Hart LLP /Qualcomm Incorporated

(57) ABSTRACT

Methods, systems, and devices for wireless communications are described. A user equipment (UE) may receive, a signal indicating a configuration for the UE to report channel state information (CSI) associated with a first set of reference signals. In some examples, the UE may receive a set of reference signals less than the first set and evaluate one or more rules for generating a CSI report based on receiving the set of reference signals. In some examples, the UE may refrain from generating the CSI report if none of the reference signals from the first set are received. In some examples, the UE may refrain from generating the CSI report of at least one reference signal is missing from the first set. In some examples, the UE may refrain from generating the CSI report if a threshold number of reference signals are missing from the first set.

30 Claims, 12 Drawing Sheets

TECHNIQUES FOR CHANNEL STATE INFORMATION REPORTING

FIELD OF TECHNOLOGY

The following relates to wireless communications, including techniques for channel state information (CSI) reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples of wireless communication, channel estimation techniques may be deficient.

SUMMARY

The described techniques relate to improved methods, systems, devices, and apparatuses that support techniques for channel state information (CSI) reporting. For example, a wireless communications system may be configured to support channel estimation for multiple network devices. In such systems, a first wireless device may transmit to a second wireless device one or more CSI reference signals that the second wireless may use to perform channel estimation on an associated channel. In some examples, the second wireless device may generate and transmit a CSI report to the first wireless device that may include the performed channel estimation information. In some examples, the first wireless device may transmit one or more pairs of reference signals that are associated with multiple transmission and reception points (TRPs) that the second wireless device may utilize to transmit an associated CSI report to the multiple TRPs indicated. In some cases, the second wireless device may not receive one or more anticipated reference signals for a CSI report and may operate in accordance with one or more rules to determine whether to generate a CSI report.

A method for wireless communications at a user equipment (UE) is described. The method may include receiving, from a base station, a signal indicating a configuration for the UE to report CSI corresponding to a first set of reference signals, evaluating one or more rules for generating a CSI report where the one or more rules are associated with CSI report generation for when a received set of reference signals is less than the first set of reference signals, and performing CSI operations according to the one or more rules.

An apparatus for wireless communications at a UE is described. The apparatus may include a processor, memory coupled with the processor, and instructions stored in the memory. The instructions may be executable by the processor to cause the apparatus to receive, from a base station, a signal indicating a configuration for the UE to report CSI corresponding to a first set of reference signals, evaluate one or more rules for generating a CSI report where the one or more rules are associated with CSI report generation for when a received set of reference signals is less than the first set of reference signals, and perform CSI operations according to the one or more rules.

Another apparatus for wireless communications at a UE is described. The apparatus may include means for receiving, from a base station, a signal indicating a configuration for the UE to report CSI corresponding to a first set of reference signals, means for evaluating one or more rules for generating a CSI report where the one or more rules are associated with CSI report generation for when a received set of reference signals is less than the first set of reference signals, and means for performing CSI operations according to the one or more rules.

A non-transitory computer-readable medium storing code for wireless communications at a UE is described. The code may include instructions executable by a processor to receive, from a base station, a signal indicating a configuration for the UE to report CSI corresponding to a first set of reference signals, evaluate one or more rules for generating a CSI report where the one or more rules are associated with CSI report generation for when a received set of reference signals is less than the first set of reference signals, and perform CSI operations according to the one or more rules.

In some examples of the method, apparatuses, and non-transitory computer-readable medium described herein, the one or more rules indicate that the UE may be to refrain from generating the CSI report if none of the reference signals from the first set of reference signals may be in the received set of reference signals.

In some examples of the method, apparatuses, and non-transitory computer-readable medium described herein, the one or more rules indicate that the UE may be to refrain from generating the CSI report if at least one reference signal from the first set of reference signals may be missing from the received set of reference signals.

In some examples of the method, apparatuses, and non-transitory computer-readable medium described herein, the one or more rules indicate that the UE may be to refrain from generating the CSI report if at least a threshold number of reference signals from the first set of reference signals may be missing from the received set of reference signals.

In some examples of the method, apparatuses, and non-transitory computer-readable medium described herein, the one or more rules include one or more rules for calculating a CSI processing unit (CPU) occupation, the one or more rules for calculating the CPU occupation indicating that the UE may be to calculate the CPU occupation as zero if at least one reference signal from the first set of reference signals may be missing from the received set of reference signals.

In some examples of the method, apparatuses, and non-transitory computer-readable medium described herein, the one or more rules include one or more rules for calculating a CPU occupation, the one or more rules for calculating the CPU occupation indicating that the UE may be to calculate the CPU occupation based on the received set of reference signals if at least one reference signal from the first set of reference signals may be missing from the received set of reference signals.

In some examples of the method, apparatuses, and non-transitory computer-readable medium described herein, the one or more rules include one or more rules for calculating a CPU occupation, the one or more rules for calculating the CPU occupation indicating that the UE may be to calculate the CPU occupation based on the received set of reference signals if at least a threshold number of reference signals from the first set of reference signals may be missing from the received set of reference signals.

In some examples of the method, apparatuses, and non-transitory computer-readable medium described herein, the one or more rules include one or more rules for calculating an active resource occupation or an active port occupation, the one or more rules for calculating the active resource occupation or the active port occupation indicating that the UE may be to refrain from including at least one reference signal in calculating the active resource occupation or the active port occupation during a time period if the at least one reference signal from the first set of reference signals may be missing from the received set of reference signals.

In some examples of the method, apparatuses, and non-transitory computer-readable medium described herein, the at least one reference signal includes at least one of a periodic reference signal, an aperiodic reference signal, a semi-persistent reference signal, or a combination thereof.

In some examples of the method, apparatuses, and non-transitory computer-readable medium described herein, the one or more rules include one or more rules for calculating an active resource occupation, the one or more rules for calculating the active resource occupation indicating that the UE may be to refrain from including at least one reference signal in calculating the active resource occupation if the at least one reference signal from the first set of reference signals may be missing from the received set of reference signals.

In some examples of the method, apparatuses, and non-transitory computer-readable medium described herein, a first CSI hypothesis corresponds to a reference signal from the first set of reference signals and a second CSI hypothesis corresponds to a pair of reference signals from the first set of reference signals.

In some examples of the method, apparatuses, and non-transitory computer-readable medium described herein, the one or more rules indicate that the UE may be to refrain from evaluating the second CSI hypothesis if a first reference signal from the pair of reference signals may be missing from the received set of reference signals.

In some examples of the method, apparatuses, and non-transitory computer-readable medium described herein, the one or more rules indicate that the UE may be to refrain from evaluating the second CSI hypothesis if a second reference signal from the pair of reference signals does not correspond to the first CSI hypothesis or may be not included in a second pair of reference signals corresponding to the second CSI hypothesis.

In some examples of the method, apparatuses, and non-transitory computer-readable medium described herein, the one or more rules indicate that the UE may be to refrain from generating the CSI report if the reference signal from the first set of reference signals and a second reference signal from the pair of reference signals may be missing from the received set of reference signals.

In some examples of the method, apparatuses, and non-transitory computer-readable medium described herein, the one or more rules indicate that the UE may be to refrain from generating the CSI report if the at least one of the reference signal from the first set of reference signals and a second reference signal from the pair of reference signals may be missing from the received set of reference signals.

In some examples of the method, apparatuses, and non-transitory computer-readable medium described herein, the one or more rules indicate that the UE may be to refrain from generating the CSI report if at least a threshold number of reference signals from the first set of reference signals may be missing from the received set of reference signals, the threshold number of reference signals corresponding to the first CSI hypothesis, or the second CSI hypothesis, or both.

In some examples of the method, apparatuses, and non-transitory computer-readable medium described herein, the one or more rules indicate that the UE may be to refrain from generating the CSI report if at least one reference signal from the first set of reference signals may be missing from the received set of reference signals and that the UE may be to generate a set of multiple CSI reports corresponding to a remaining number of reference signals of the first set of reference signals.

In some examples of the method, apparatuses, and non-transitory computer-readable medium described herein, the one or more rules indicate that the UE may be to refrain from transmitting an uplink channel if the UE refrains from generating the CSI report.

In some examples of the method, apparatuses, and non-transitory computer-readable medium described herein, the one or more rules indicate that the UE may be to transmit an uplink channel including an uplink control information or an uplink transport block if the UE refrains from generating the CSI report.

In some examples of the method, apparatuses, and non-transitory computer-readable medium described herein, at least one reference signal from the first set of reference signals may be missing from the received set of reference signals based on a listen before talk failure in unlicensed band, an uplink and downlink symbol conflict, a resource overlap with a downlink channel, or a combination thereof.

In some examples of the method, apparatuses, and non-transitory computer-readable medium described herein, the uplink and downlink symbol conflict may be based on detection of at least one of a downlink control information (DCI) scheduling uplink signal, a slot format indicator, an overlap between a physical random access channel (PRACH) occasion and a gap symbol prior to the PRACH occasion, or a combination thereof.

In some examples of the method, apparatuses, and non-transitory computer-readable medium described herein, the resource overlap with the downlink channel may be determined based on a channel type, a priority of downlink channel compared to a priority of the CSI resource, a scheduling of the downlink channel, or a combination thereof.

DETAILED DESCRIPTION

Figure 1:
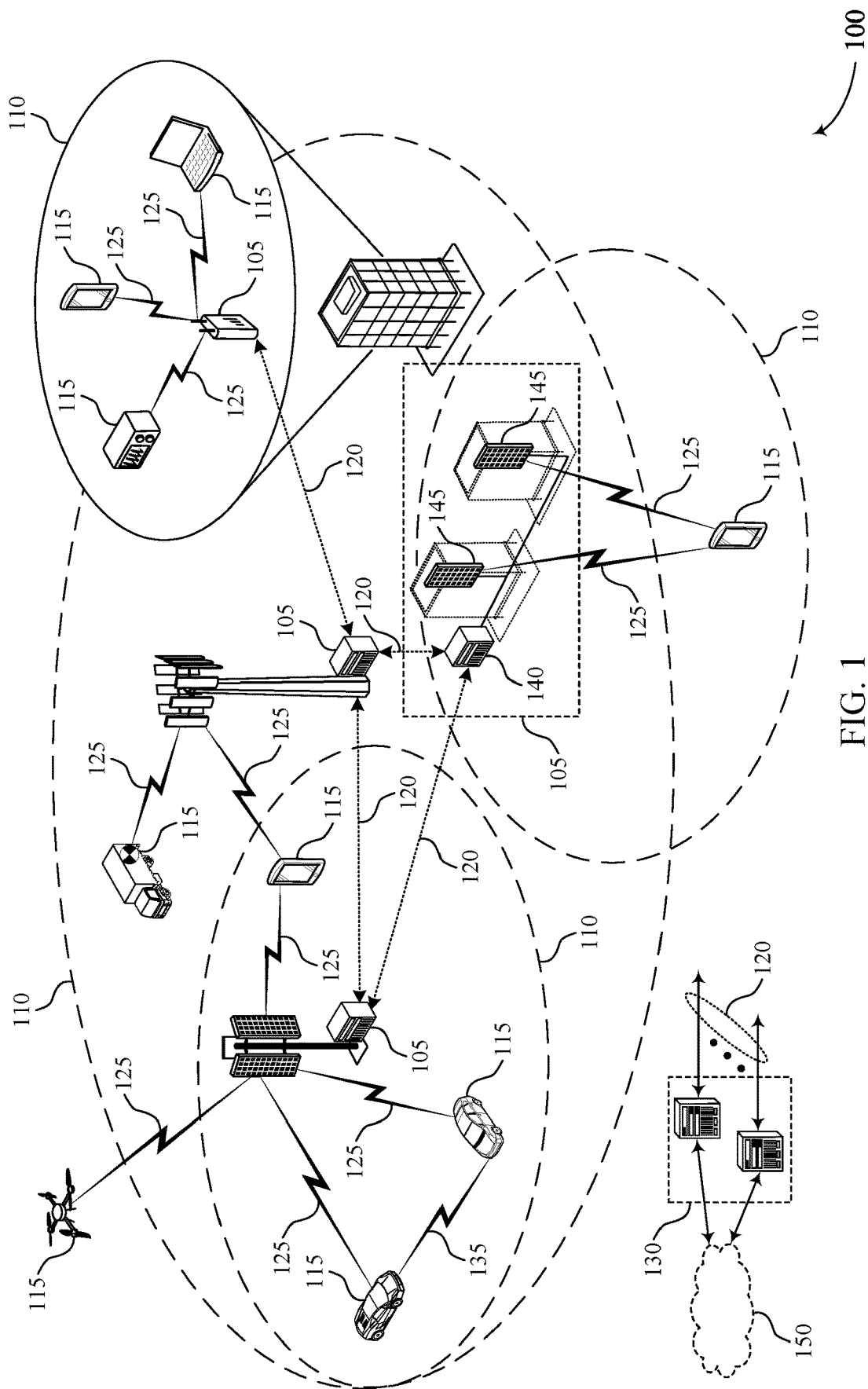
FIG. 1 illustrates an example of a wireless communications system that supports techniques for channel state information (CSI) reporting.

In some wireless communications systems, a first wireless device (e.g., a base station) may transmit one or more channel state information (CSI) reference signals (CSI-RS) to a second wireless device (e.g., a user equipment (UE)). In some examples, the CSI-RS may indicate resources, such as one or more channel measurement resources (CMRs) or interference measurement resources (IMRs) that the UE may use to measure various channel qualities. The UE may then include the measurements in a CSI report for the base station. The UE may utilize one or more CSI processing units (CPUs) to handle the complexity associated with the various CSI computations such that the number of CPUs may be equal to the number of CMRs configured for the CSI report. In some cases, however, the UE may not receive one or more CSI resources (e.g., CMRs and IMRs) from the base station. While various CSI resources may be dropped, in some examples, the UE may still generate a CSI report which may increase the number of occupied CPUs, the number of active resource, and the number of occupied ports occupation at the UE. As such, the UE may experience an increase in overall power consumption based on the increase in CPU occupation and signaling overhead based on increase in the number of generated CSI reports.

By operating in accordance with the techniques described herein, a UE may refrain from transmitting a CSI report to a base station (e.g., drop the CSI report) based on a set of configured rules at the UE. For example, the configured rules may indicate to the UE when to drop a CSI report. In some instances, the rules may indicate that the UE is to refrain from transmitting the CSI report when a base station drops or the UE does not receive at least one CSI-RS resource. In some examples, the UE may determine to refrain from transmitting the CSI report if all CMRs associated with the CSI report are dropped. In some examples, the UE may determine to refrain from transmitting the CSI report if at least one CMR associated with the CSI report is dropped. In some examples, the UE may determine to refrain from transmitting the CSI report if the number of dropped CMRs associated with the CSI report is greater than a configured threshold. The UE may determine to refrain from transmitting the CSI report based on the priority of the CSI. Additionally or alternatively, the rules for dropping the CSI report may be configured by the base station based on latency and reliability constraints. In some cases, the UE may participate in transmitting CSI reports to multiple transmission and reception points (mTRPs) at one or more base stations. In such cases, the CSI report may be associated with one or more pairs of CMRs each associated with a respective TRP. If at least one of the two CMRs are dropped, the UE may not count the pair of CMRs towards an active resource or port occupation. The UE may determine to drop a CSI report associated with pairs of CRMs.

UEs supporting techniques for CSI reporting depicted herein may utilize the techniques described herein to experience power savings and extended battery life while ensuring reliable and efficient communications. Particular aspects of the subject matter described in this disclosure may be implemented to support high reliability and low latency communications, among other examples. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems, CSI report configurations, CSI report generations, and signaling techniques. Aspects of the disclosure are further illustrated by and described with reference to apparatus diagrams, system diagrams, and flowcharts that relate to techniques for CSI reporting.

FIG. 1 illustrates an example of a wireless communications system 100 that supports techniques for CSI reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 and a UE 115 may participate in channel estimation techniques to determine the quality and other characteristics of a physical channel. For example, the base station 105 may transmit to the UE 115 one or more CSI-RSs which the UE may leverage to perform various channel estimations. For example, the base station 105 may transmit CMRs for the UE 115 to conduct various channel measurements and IMRs for the UE 115 to measure the interference on the channel. In some examples, the UE 115 may include the one or more measurements conducted using the CMRs and IMRs to generate a CSI report for the base station 105.

In accordance with examples as disclosed herein, devices of wireless communications system 100 may be configured with a set of one or more rules used to determine whether to generate a CSI report. That is, in some cases, the UE 115 may refrain from generating a CSI report associated with a set of CSI-RSs if the UE 115 receives a subset of the set of CSI-RSs (e.g., one or more CSI resources are dropped by the base station 105). In some examples, the one or more rules may indicate that the UE 115 is to drop a CSI report if all CMRs associated with the CSI report are not received or dropped by the base station 105. In some examples, the one or more rules may indicate that the UE 115 is to drop a CSI report if at least one CMR associated with the CSI report is dropped by the base station 105. In some examples, the one or more rules may indicate that the UE 115 is to drop the CSI report if the number of dropped CMRs associated with the CSI report is greater than a configured threshold (e.g., a threshold configured by the network, configured by the base station 105, or preconfigured at the UE 115). The UE 115 may determine whether to drop a CSI report based on a priority of the CSI or the UE 115 may be configured by the network based on latency and reliability constraints.

In some cases, the UE 115 may participate in mTRP CSI reporting at one or more base stations 105. In such cases, the CSI report may be associated with one or more pairs of CMRs each associated with a respective TRP. If at least one of the two CMRs are dropped, the pair of CMRs may not be counted toward CPU occupation, active resources, or port occupation. Each pair of CMRs may be associated with a non-coherent joint transmission (NCJT) hypothesis and the UE 115 may determine to generate a CSI report based on the NCJT based on the one or more rules described herein.

Figure 2:
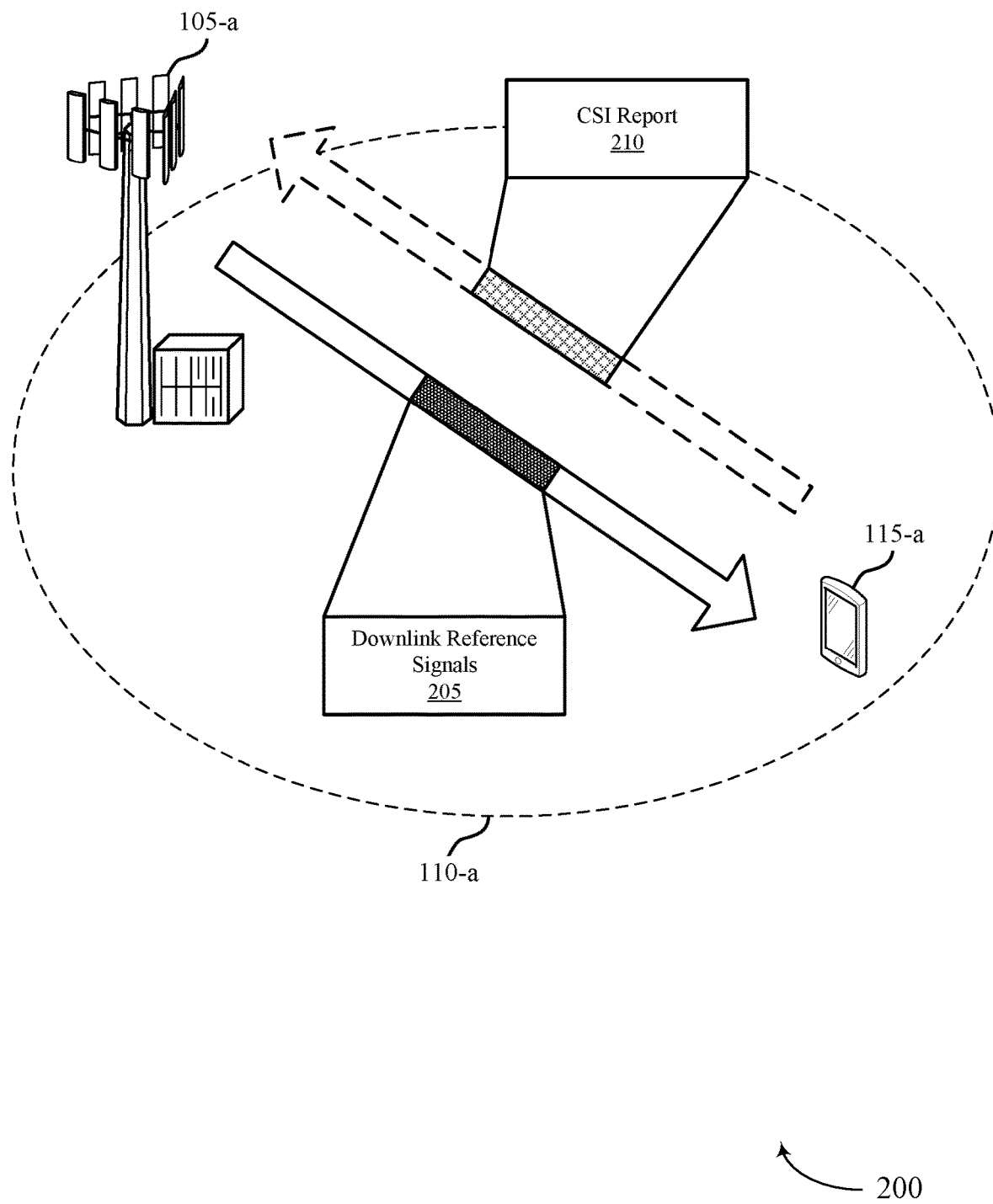
FIG. 2 illustrates an example of a wireless communications system that supports techniques for CSI reporting in accordance with aspects of the present disclosure.

FIG. 2 illustrates an example of a wireless communications system 200 that supports techniques for CSI reporting in accordance with aspects of the present disclosure. In some examples, the wireless communications system 200 may implement aspects of wireless communications system 100. The wireless communications system 200 includes a base station 105-a, which may be an example of a base station 105 as depicted in the example of FIG. 1, a geographic coverage area 110-a which may be an example of a geographic coverage area 110 as depicted in the example of FIG. 1, and a UE 115-a, which may be examples of a UE 115 as depicted in the example of FIG. 1. In some cases of wireless communications system 200, the base station 105-a may transmit one or more downlink reference signals 205 to the UE 115-a. In some implementations, the downlink reference signals 205 may be CSI-RSs, which the UE 115-a may use to generate a CSI report 210 for the base station 105-a. Additionally or alternatively, the base station 105-a may transmit a signal indicating a configuration for the UE 115-a to use in reporting CSI corresponding to the downlink reference signals 205. The UE 115-a may determine whether to generate and transmit the CSI report 210 based on evaluating one or more rules for generating the CSI report 210 if the received set of downlink reference signals 205 is less than an anticipated number of reference signals. For example, the UE 115-a may perform channel state information operations which may include one or more steps related to measuring and reporting CSI information or reports. In some examples, based on the evaluation of the one or more rules, the channel state information operations may include determine whether to generate a CSI report, and in some cases may include refraining from generating a CSI report.

The wireless communications system 200 may support beamforming communications between the base station 105-a and the UE 115-a. In some examples, the base station 105-a and the UE 115-a may communicate with one another using one or more channels (such as physical channels) to transmit and receive control signal and data. In some examples of the wireless communications system 200, the one or more channels may experience interference which may modify a signal in a disruptive manner, as it travels along a communication channel between the base station 105-a and UE 115-a. In the example of wireless communications system 200, channel interference may be caused by physical boundaries (e.g., passing cars, buildings, trees, etc.), by transmission from other wireless devices in the same direction of the base station 105-a and the UE 115-a or on the same frequency band, by self-interference, or a combination thereof. As such, the wireless devices in wireless communications system 200 may estimate and communicate conditions of the communication channels. For example, the base station 105-a may transmit one or more downlink reference signals 205 which the UE 115-a may use for the purpose of channel sounding to measure characteristics of a radio channel. As depicted in the example of FIG. 2, the UE 115-a may use the downlink reference signals 205 to generate a CSI report 210 that the UE 115-a may then transmit to the base station 105-a. The CSI report 210 may include a channel quality indicator (CQI), a precoding matrix index (PMI), and a rank indicator (RI). The CSI report 210 may indicate interference between multiple antennas at the UE 115-a, among other examples. The base station 105-a may receive the CSI report 210 and may use its contents to update a modulation coding scheme (MCS), a code, or beam forming, among other examples, to improve the channel quality.

The downlink reference signals 205 may include various resources for the UE 115-a to use in generating the CSI report 210. For example, the downlink reference signals 205 may include channel measurement resources (CMRs), CSI interference measurement (CSI-IM) resources, and non-zero-power (NZP) interference measurement resources (NZP-IMRs). The UE 115-a may use the CMRs, the CSI-IM resources, and the NZP-IMRs included in the downlink reference signals 205 to measure various channel qualities. For generating the CSI report 210, the UE may utilize one or more CPUs to handle the complexity associated with the various CSI computations. In some examples, the number of CPUs may be equal to the number of CMRs configured for the CSI report 210. In some cases, however, the UE 115-a may not receive one or more CSI resources. In some cases, the UE 115-a may not receive the resources due to listen-before-talk (LBT) failure in cases in which the base station 105-a and the UE 115-a are communicating in an unlicensed frequency band.

According to one or more aspects, the UE 115-a may determine that at least one reference signal is missing based on an LBT failure in unlicensed band, an uplink and downlink symbol conflict, a resource overlap with a downlink channel, or a combination thereof. In some cases, the UE 115-a may not receive the CMRs due to time division duplex (TDD) uplink and downlink symbol conflict. For example, some of the symbols intended for transmission of the downlink reference signals 205 may be identified as uplink symbols, and as such the base station 105-a may drop at least one reference signal from the downlink reference signals 205 and their associated resources for these symbols. This TDD symbol conflict may be caused based on detection of a DCI scheduling uplink signals or channels (such as a physical uplink shared channel (PUSCH), a physical uplink control channel (PUCCH), a sounding reference signal (SRS), or a physical random access channel (PRACH)). The uplink and downlink symbol conflict may be based on detection of at least one of a DCI scheduling uplink signal, an SFI, an overlap between a PRACH occasion and a gap symbol prior to the PRACH occasion, or a combination thereof. In some examples, the TDD symbol conflict may be determined based on the base station 105-a detecting a slot format indicator (SFI) of DCI format 2_0, which may indicate some of the symbols as uplink or flexible symbols, or it may be based on overlap with a valid PRACH occasion and a number of gap symbols before the PRACH occasion.

In some cases, the UE 115-a may not receive one or more resources included in the downlink reference signals 205 due to resource (e.g., time and frequency) overlap with another downlink channel or signal. The UE 115-a may determine the resource overlap with the downlink channel based on a channel type, a priority of downlink channel compared to a priority of the CSI resource, a scheduling of the downlink channel, or a combination thereof. For example, a CSI-RS resource may be dropped if the resource overlaps with another physical downlink shared channel (PDSCH), a physical downlink shared channel (PDCCH), or with a synchronization signal block (SBB). In another example, a CSI-RS resource may be dropped based on priority of another downlink channel or signal compared to the priority of the CSI-RS resource (e.g., a CSI-RS with a priority of 0 is dropped if it overlaps with another CSI-RS resource with a priority of 1). In another example, a CSI-RS resource may be dropped based on whether a CSI-RS resource or the associated downlink channel or signal is configured by a higher-layers or is dynamically scheduled by a DCI (e.g., periodic CSI-RS resource may be dropped due to overlap with dynamically scheduled PDSCH or due to overlap with an aperiodic CSI-RS dynamically scheduled by DCI).

The UE 115-a may be configured to report CSI corresponding to a first set of reference signals (e.g., anticipated downlink reference signals 205). In some examples, the UE 115-a may receive a set of downlink reference signals 205 less than the first set of reference signals. If the UE 115-a receives a subset of the anticipated downlink reference signals 205, the UE 115-a may still determine to utilize resources to generate the CSI report 210. For example, the UE 115-a may evaluate one or more rules for generating the CSI report 210 if the received set of downlink reference signals 205 is less than the first set of reference signals. Despite examples in which one or more CSI resources may be dropped by the base station 105-a, the UE 115-a may generate the CSI report 210 which may increase a number of occupied CPUs, active resources, and port occupation at the UE 115-a thus increasing overall power consumption and signaling overhead.

To minimize the occupation of CPUs and use of processing resources, the UE 115-a may determine to not transmit a CSI report 210 to a base station 105-a (e.g., drop the CSI report 210) based on not receiving, from the base station 105-a, one or more CSI resources included in the downlink reference signals 205. In some examples, the UE 115-a may determine to drop a CSI report 210 if all CMRs associated with the CSI report 210 are dropped. In some examples, the UE 115-a may determine to drop a CSI report 210 if at least one CMR associated with the CSI report 210 is dropped. In some examples, the UE 115-a may determine to drop the CSI report 210 if the number of dropped CMRs associated with the CSI report 210 is greater than a configured threshold. The UE 115-a may determine whether to drop a CSI report 210 based on a priority of the CSI. Additionally or alternatively, rules for dropping a CSI report 210 may be configured by the network based on latency and reliability constraints. Further description of the various rules used by the UE 115-a to determine whether to generate and transmit a CSI report 210 are described herein, including with reference to FIGS. 3 and 4.

In some cases, the UE 115-a may participate in transmitting one or more CSI reports 210 in accordance with an mTRP operation. For example, the base station 105-a may configure the UE 115-*a* to transmit one or more CSI reports 210 to one or more TRPs that may be located at the base station 105-*a* or one or more other base station 105-*as* 105 (e.g., a non-coherent joint transmission (NCJT) CSI report). In such examples of an NCJT CSI report, the CSI report 210 may be associated with one or more pairs of CMRs such that each CMR in a pair is associated with a respective TRP. If at least one of the two CMRs are dropped, the UE 115-*a* may determine that the pair of CMRs is not counted toward active resource or port occupation. The UE 115-*a* may determine to drop the CSI report 210 associated with the pair of CRMs in a similar method for dropping a CSI report 210 associated with independent CRMs for singe TRP (sTRP) transmissions. Further description of the various rules used by the UE 115-*a* to determine whether to generate and transmit a NCJT CSI report 210 are described herein, including with reference to FIG. 6.

Figure 3:
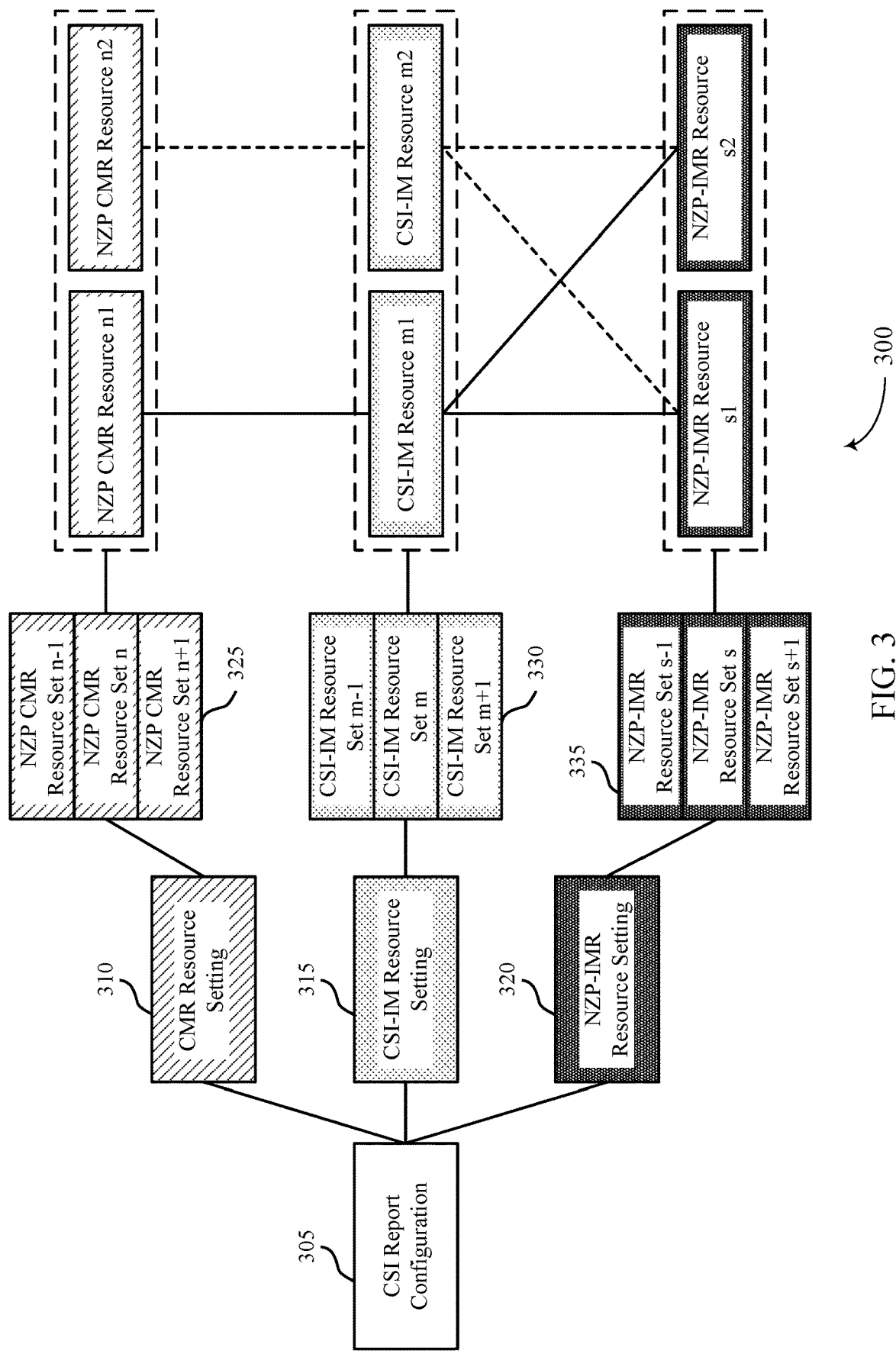
FIG. 3 illustrates an example of a CSI report framework that supports techniques for CSI reporting in accordance with aspects of the present disclosure.

FIG. 3 illustrates an example of a CSI report framework 300 that supports techniques for CSI reporting in accordance with aspects of the present disclosure. In some examples, the CSI report framework 300 may implement aspects of the wireless communications system 100 and the wireless communications system 200. The CSI report framework 300 may be an example of a framework used by a UE 115 and a base station 105 to generate a CSI report.

The CSI report framework 300 illustrates a CSI report configuration 305 that may be used by a UE 115 to generate a CSI report for a base station 105. The CSI report configuration 305 may include one or more links to one or more resource settings. In some examples, the CSI report configuration 305 may have a link to a CMR resource setting 310. In some examples, the CSI report configuration 305 may indicate the CMR resource setting 310 as well as either a CSI-IM resource setting 315 or an NZP-IMR resource setting 320. In some examples, the CSI report configuration 305 may have a link to the CMR resource setting 310, the CSI-IM resource setting 315, and the NZP-IMR resource setting 320.

As illustrated in the CSI report framework 300, each of the resource settings may include an active resource set. For example, the CMR resource setting 310 may include or otherwise indicate multiple CMR resource sets 325 in which CMR resource set n is activated. The CSI-IM resource setting 315 may include multiple CSI-IM resource sets 330 in which the CSI-IM resource set m is activated, and the NZP-IMR resource setting 320 may include multiple NZP-IMR resource sets 335 in which the NZP-IMR resource set s is activated. Each of the resource sets associated with the CSI report configuration 305 (e.g., CMR resource set n, CSI-IM resource set m, and NZP-IMR resource sets) may include one or more resources (e.g., N number of resources). The UE 115 may evaluate the CSI report configuration 305 and may select at least one CMR resource out of the N resources included in the CMR resource set n. Each CMR resource may have an associated CSI-IM resource and may be collectively associated with all NZP resources from the activated NZP-IMR resource set 335. For example, if the UE 115 selects NZP CMR resource n1, it may also select CSI-IM resource m1 and all NZP-IMR resources from NZP-IMR resource set s. If the UE 115 selects NZP CMR resource n2, it may also select CSI-IM resource m2 and all NZP-IMR resources from NZP-IMR resource sets. The UE 115 may include a CRI in the CSI report to indicate to the base station 105 which NZP CMR resource was used to generate the CSI report.

In some examples, the base station 105 may configure the UE 115 with one or more CSI report configurations 305. The CSI resources selected by the UE 115 for each CSI report configuration 305 may occupy a number of CPUs. For example, the base station 105 may indicate a CSI report quantity of interest (e.g., cri-received signal received power (cri-RSRP), ssb-Index-RSRP, or a receive beam sweep), and the UE 115 may utilize a CPU to generate a CSI report associated with the quantity of interest. In some examples, the number of occupied CPUs may be equal to the number of NZP CMR resources included in the activated NZP CMR resource set 325. In the example of CSI report framework 300, the number of occupied CPUs for the CSI report configuration 305 may be two such that NZP CMR resource n1 may occupy a first CPU and NZP CMR resource n2 may occupy a second CPU. In some examples, the number of occupied CPUs may not be greater than the total number of CPUs associated with the UE 115. If the number of occupied CPUs for the one or more CSI report configurations 305 is greater than the total number of CPUs associated with the UE 115, the UE 115 may refrain from updating any additional CSI report configurations 305. In some examples, the UE 115 may indicate, to the base station 105, a total number of associated CPUs (e.g., via RRC signaling).

The UE 115 may also have associated capability metrics for a maximum number of active CSI-RS resources the UE 115 may support, and a maximum number of CSI-RS ports that may be occupied for the one or more CSI report configurations 305. For example, if a UE is configured to generate a CSI-RS N times by one or more CSI reporting settings, the CSI-RS resource and the CSI-RS ports within the CSI-RS resource may be counted by the UE 115 N times. The UE 115 may transmit the capability metrics associated with the maximum number of active resources and active ports to the base station 105 (e.g., via RRC signaling).

In some examples, the UE 115 may determine to drop (e.g., refrain from transmitting) a CSI report generated for a CSI report configuration 305. For example, the UE 115 may determine to drop a CSI report if the CSI report is transmitted on a PUCCH or a PUSCH that has a lower priority compared another overlapping uplink channel while multiplexing rules are not applicable. For example, a CSI report on a PUSCH or PUCCH may have an associated priority of 0 while another PUSCH or PUCCH may have an associated priority of 1, and as such the UE 115 may drop the CSI report. In some examples, the UE 115 may determine to drop a CSI report that is transmitted using a PUSCH due to the PUSCH being canceled (e.g., due to conflict or by the base station 105). For instance, the UE 115 may receive a DCI which may include uplink calculation indication (e.g., DCI format 2_4) that may indicate to the UE 115 a set of uplink symbols to cancel, and if one or more symbols indicated overlap with the CSI report, the UE 115 may drop the CSI report. In some examples, the UE 115 may drop the CSI report if the CSI report is on a periodic PUCCH with flexible symbols. For instance, the UE 115 may receive a DCI that indicates that symbols initially intended to carry the CSI on the PUCCH have been changed to downlink symbols and the UE 115 may drop the CSI report (e.g., a DCI of format 1_0, 1_1, or 1_2 scheduling a PDSCH on flexibles symbols or a DCI of format 2_0 for SFI).

While the UE 115 may determine to drop a CSI report due to dropping the uplink channel carrying the CSI report or due to the priority of the CSI report, it may also be advantageous for the UE 115 to drop a CSI report if one or more CSI-RS resources are not received from the base station 105. For example, the base station 105 may drop CMRs or NZP-IMRs as described with reference to FIG. 2. If the UE 115 proceeds to generate a CSI report, despite the base station 105 dropping one or more CSI-RS resources, the UE 115 may use additional CPUs that would otherwise be unused as well as increase the number or active resources and CSI ports.

One or more aspects of the present disclosure provide for techniques to minimize the occupation of CPUs and the use of processing resources. According to aspects depicted herein, the UE 115 may determine to not transmit a CSI report based on one or more rules. The one or more rules may be indicated by a base station via a signal. The UE 115 may refrain from transmitting a CSI report (e.g., to a base station 105) based on not receiving, from the base station 105, one or more CSI resources included in the CSI report configuration 305. In some examples, the UE 115 may determine to drop a CSI report if all CMRs associated with a CSI report are dropped. For example, if the base station 105 dropped both NZP CMR resource n1 and NZP CMR resource n2, the UE 115 may refrain from generating the associated CSI report. In some examples, the UE 115 may determine to drop a CSI report if at least one CMR associated with the CSI report is dropped. For instance, if the base station 105 dropped either NZP CMR resource n1 or NZP CMR resource n2, the UE 115 may refrain from generating a CSI report. In some examples, the UE 115-*a* may determine to drop the CSI report if the number of dropped CMRs associated with the CSI report is greater than a configured threshold. For instance, if the base station 105 dropped both NZP CMR resource n1 and NZP CMR resource n2, and the configured threshold indicates to drop the CSI report if more than one associated CMR is dropped, then the UE 115 may drop the CSI report. Further description of the various rules used by the UE 115 to determine whether to generate and transmit a CSI report are described herein, including with reference to FIGS. 4A-4C.

Figure 4A:
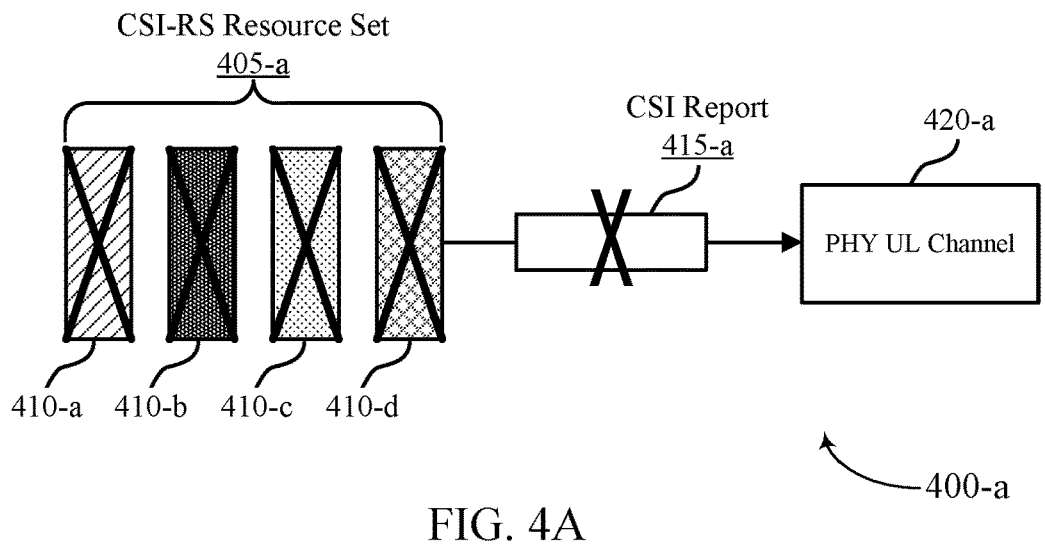
FIG. 4A— 4C illustrate examples of CSI report generation that supports techniques for CSI reporting in accordance with aspects of the present disclosure.
Figure 4B:
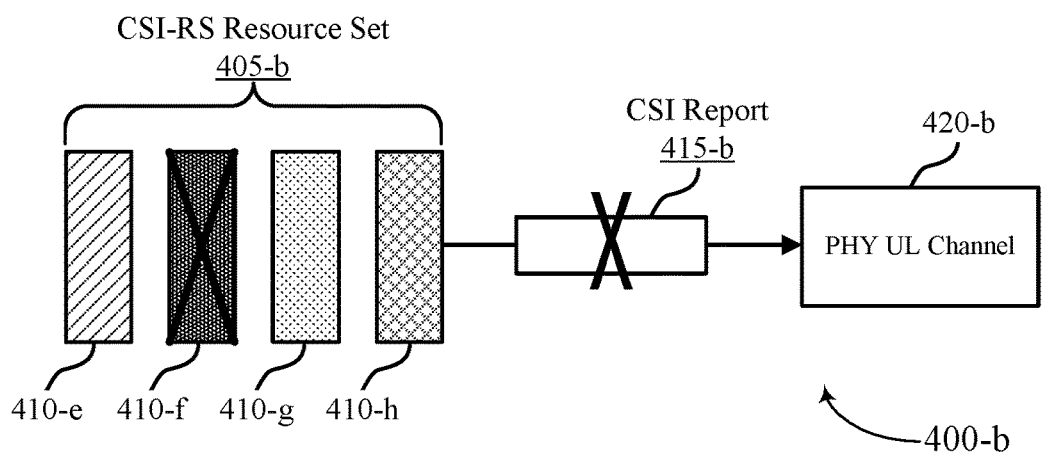
Figure 4C:
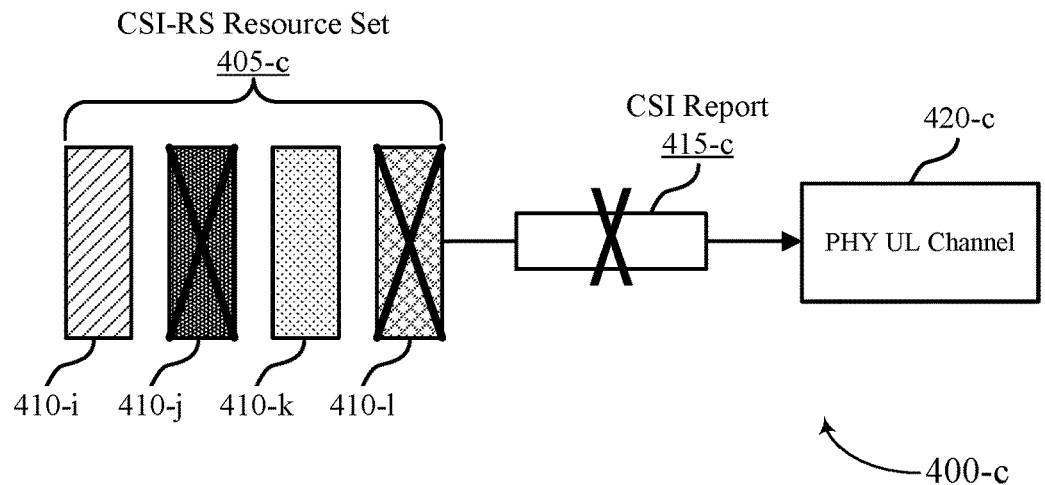

FIGS. 4A-4C illustrate examples of a CSI report generation 400-*a*, a CSI report generation 400-*b*, and a CSI report generation 400-*c* that support techniques for CSI reporting in accordance with aspects of the present disclosure. In some examples, the CSI report generation 400-*a*, the CSI report generation 400-*b*, and the CSI report generation 400-*c* may implement aspects of the wireless communications system 100 and the wireless communications system 200. The CSI report generation 400 (e.g., CSI report generation 400-*a*, CSI report generation 400-*b*, and CSI report generation 400-*c*) may include CSI-RS resource sets 405 (e.g., CSI-RS resource set 405-*a*, CSI-RS resource set 405-*b*, and CSI-RS resource set 405-*c*) that may include multiple CSI-RS reference signals 410 (e.g., CSI-RS reference signal 410-*a*, CSI-RS reference signal 410-*b*, and CSI-RS reference signal 410-*c*) that a base station 105 may transmit to a UE 115 for CSI report 415 (e.g., CSI report 415-*a*, CSI report 415-*b*, and CSI report 415-*c*) generation. The UE 115 may determine, using a set of configured rules, to generate a CSI report 415 in accordance with receiving a subset of the anticipated CSI-RS resources 410 included in the CSI-RS resource set 405. Generally, CSI report generations 400-*a*-400-*c* illustrate various implementations of the rules configured at the UE 115 for determining whether to generate a CSI report 415.

In accordance with the techniques described herein, the UE 115 may determine to drop (e.g., refrain from generating) a CSI report 415 if one or more CSI-RS resources 410 are not received (e.g., dropped) by the UE 115. In some examples, the CSI-RS resources 410 may be CMRs which the UE 115 may use for channel measurements or may be NZP-INRs which the UE 115 may use of interference measurements. If the UE 115 determines to generate a CSI report 415 based on receiving one or more CSI-RS resources 410 from the base station 105, the UE 115 may include the CSI report on a physical uplink channel 420. In some examples, the physical uplink channel 420 may be a PUCCH if the UE 115 is operating in accordance with a periodic or a semi-persistent CSI report 415 generation. In some examples, the physical uplink channel 420 may be a PUSCH if the UE 115 is operating in accordance with an aperiodic or a semi-persistent CSI report 415 generation. In some implementations, the base station 105 may schedule a UE 115 to transmit a CSI report 415 in an uplink channel transmission. If the UE 115 determines to drop the CSI report 415 such that the physical uplink channel 420 is empty after dropping the CSI report 415, the UE 115 may drop the entire physical uplink channel 420 along with the CSI report. In some other implementations, the UE 115 may transmit the CSI report 415 along with additional uplink control information (UCI) or additional uplink transport blocks and may determine to drop the CSI report. In such cases, the UE 115 may drop the CSI report 415, and may transmit the physical uplink channel 420 with the additional UCI or uplink transport blocks. For example, the physical uplink channel 420 may carry additional CSI reports 415 corresponding to other CSI-RS resources 410, HARQ-Acknowledgments, or various other uplink transport blocks.

In some examples, a CSI report 415 setting may include or indicate multiple CMRs associated with multiple CSI hypotheses (e.g., more than one CMR may be configured in a CSI-RS resource set 405 for the report setting). For example, CSI-RS resource set 410-*a* through CSI-RS resource set 410-1 may be examples of CMRs included in their respective CSI-RS resource sets 405. In some examples, one or more CMRs may be dropped by the base station 105 during transmission of the CSI-resource set 405. In such examples, the UE 115 may perform CSI operations according to one or more configured rules to determine whether to generate the CSI report 405 if one or more associated CMRs are dropped.

According to one or more aspects, a UE 115 may receive a signal indicating a configuration for the UE to report CSI corresponding to a first set of reference signals (e.g., CSI-RS resource set 405-*a*, CSI-RS resource set 405-*b*, and CSI-RS resource set 405-*c*). The UE 115 may evaluate one or more rules for generating a CSI report 415 when a received set of reference signals is less than the first set of reference signals. The UE 115 may then generate the CSI report 415 according to the one or more rules.

In some examples, the one or more rules may indicate that the UE 115 is to refrain from generating the CSI report 415 if none of the reference signals from the first set of reference signals are in the received set of reference signals. As depicted in the example of FIG. 4A, the UE 115 may determine to drop a CSI report 415-*a* if all associated CMRs in CSI-RS resource set 405-*a* are not received by the UE 115 or dropped by the base station 105. For instance, CSI-RS resource 410-*a* through CSI-RS resource 410-*d* may be examples of CMRs (e.g., received set of reference signals) included in CSI-RS resource set 405-*a*, and each of CSI-RS resources 410-*a* through CSI-RS resource 410-*d* may have been dropped by the base station 105, as illustrated in FIG. 4A. Due to all CMRs included in the CSI-RS resource set 405-*a* being dropped by the base station 105-*a* or otherwise not received by the UE 115, the UE 115 may refrain from generating (e.g., drop) the associated CSI report 415-*a*. The UE 115 may determine that if there is at least one non-dropped CMR, then there is at least one CSI hypothesis. For the CSI report, the UE 115 may consider the non-dropped CMRs as valid CSI hypotheses. As such, the UE 115 may refrain from including the CSI report 415-*a* on the physical uplink channel 420-*a*. In some examples, if there is at least one non-dropped CMR, there is at least one CSI hypothesis that the UE 115 may use to generate the CSI report 415-*a*. For example, if CSI-RS 410-*a* was received by the UE 115 and is an example of a CMR, the UE 115 may generate the UE 115 CSI report 415-*a* based on CSI-RS 410-*a*. If the CSI report 415-*a* is generated, a CRI included in the CSI report 415-*a* may be associated with the one of the non-dropped CMRs.

In some examples, the one or more rules may indicate that the UE 115 is to refrain from generating the CSI report 415 if at least one reference signal from the first set of reference signals is missing from the received set of reference signals. As depicted in the example of FIG. 4B, the UE 115 may determine to generate a CSI report 415-*b* based on evaluating one or more rules and reporting based on the evaluation. As such, the UE 115 may determine to drop a CSI report 415-*b* if at least one of the CMRs in CSI-RS resource set 405-*b* is dropped by the base station 105. For instance, CSI-RS resource 410-*e* through CSI-RS resource 410-*h* may be examples of CMRs included in CSI-RS resource set 405-*b*. The UE 115 may determine that since at least one CSI hypothesis cannot be evaluated, the CSI report does not correspond to the CSI request from the base station 105 (for UE to evaluate all hypotheses and report one). As illustrated in FIG. 4B, CSI-RS 410-*f* may be dropped by the base station 105 or the UE 115 may not receive it, and as such the UE 115 may determine to refrain from generating (e.g., drop) the associated CSI report 415-*b*. In the example of FIG. 4B, the UE 115 may refrain from including the CSI report 415-*b* on the physical channel 420-*b*.

In some examples, the one or more rules may indicate that the UE 115 is to refrain from generating the CSI report 415 if at least a threshold number of reference signals from the first set of reference signals is missing from the received set of reference signals. In the example of FIG. 4C, the UE 115 may determine to generate a CSI report 415-*c* based on evaluating that the number of reference signals is greater than a configured threshold (according to the one or more rules) and the UE 115 may determine reporting of the CSI report 415-*c* based on the evaluation. As such, the UE 115 may determine to drop the CSI report 415-*c* if the number of CMRs in CSI-RS resource set 405-*b* dropped by the base station 105 is greater than the configured threshold. For instance, CSI-RS resource 410-*i* through CSI-RS resource 410-1 may be examples of CMRs included in CSI-RS resource set 405-*c*. As illustrated in FIG. 4B, CSI-RS resource 410-*j* and CSI-RS resource 410-*l* are dropped by the base station 105 or otherwise not received by the UE 115. If the configured threshold for the number of allowed dropped CMRs is one, then the UE 115 may determine to refrain from generating (e.g., drop) the associated CSI report 415-*c*. In the example of FIG. 4C, the UE 115 may refrain from including the CSI report 415-*b* on the physical channel 420-*c*.

The UE 115 may determine to generate a CSI report 415 in accordance with the one or more rules described in FIGS. 4A-4C based on the priority of the CSI. For example, if the priority of the CSI is relatively low (e.g., the priority is below a threshold configured by the network) the UE 115 may determine to operate in accordance with the techniques of FIG. 4B. If the priority of the CSI is relatively high (e.g., the priority is greater than or equal to the threshold configured by the network) the UE 115 may determine to operate in accordance with the techniques of either FIG. 4A or 4C.

In some examples, the UE 115 may determine to generate a CSI report 415 in accordance with the one or more rules described in FIGS. 4A-4C based on latency or reliability requirements configured by the network.

Figure 5:
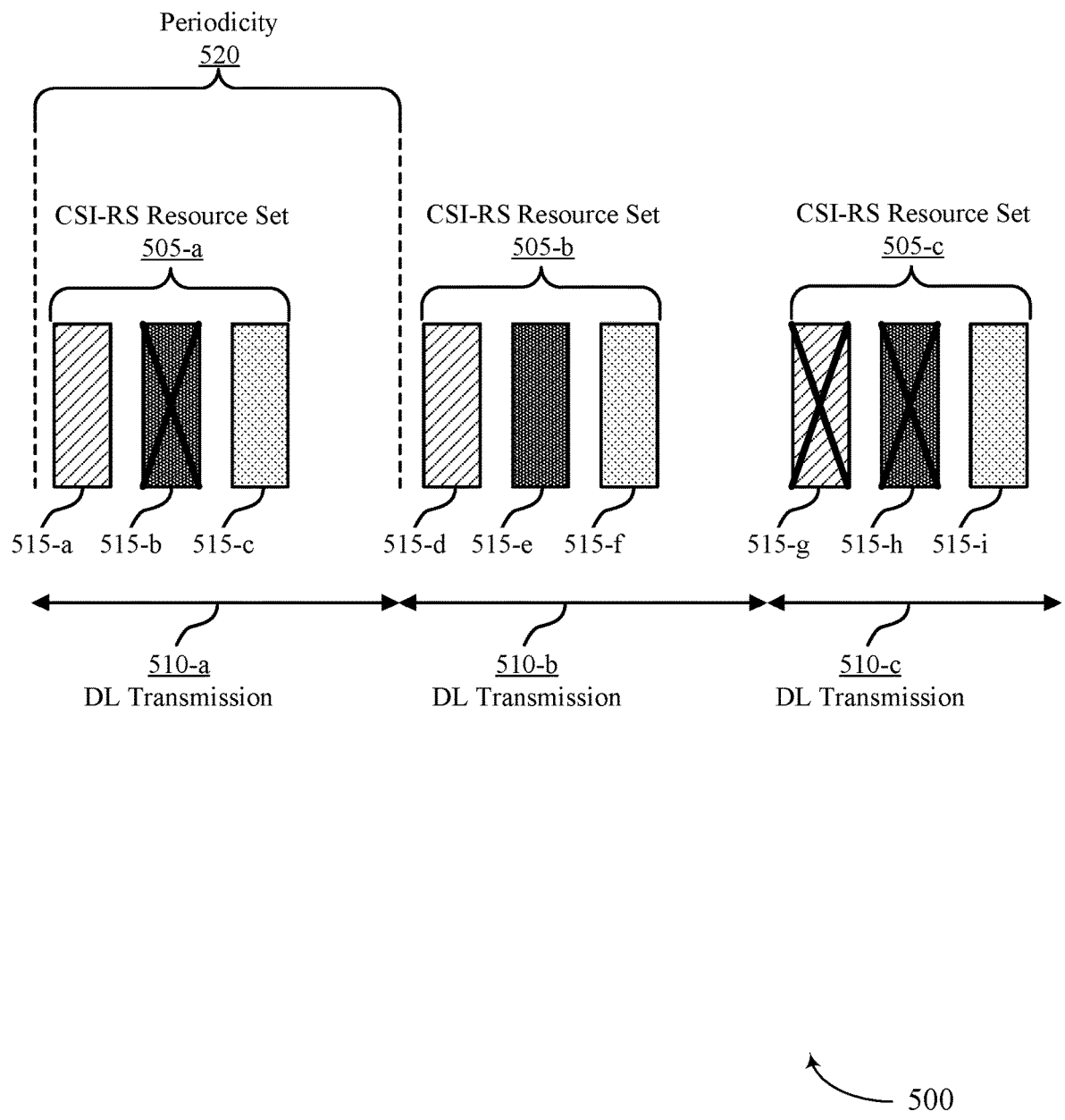
FIG. 5 illustrates an example of a downlink transmission timeline that supports techniques for CSI reporting in accordance with aspects of the present disclosure.

FIG. 5 illustrates an example of a downlink transmission timeline 500 that supports techniques for CSI reporting in accordance with aspects of the present disclosure. In some examples, downlink transmission timeline 500 may implement aspects of wireless communications system 100, wireless communications system 200, CSI report framework 300, CSI report generation 400, or a combination thereof. The downlink transmission timeline 500 may include multiple periodic or semi-persistent downlink transmissions 510 in which each transmissions may include a CSI-RS resource set 505 that a receiving device (e.g., UE) may use to generate an associated CSI report. The downlink transmission timeline 500 may be implemented by a UE 115 and a base station 105, which may be examples of a UE 115 and a base station 105 as described with reference to FIGS. 1 and 2.

In some examples of the downlink transmission timeline 500, a base station 105 may transmit the multiple downlink transmissions 510 to a UE 115. As such, the UE 115 may use one or more CMRs 515 included in a received CSI-RS resource set 505 to generate a CSI report to send in response to the base station 105. The multiple downlink transmissions 510 may be transmitted on a periodic or semi-persistent basis and may have an associated periodicity 520. In some examples, the CMRs 515 included in a CSI-RS resource set 505 for a given downlink transmission 510 may be dropped by the transmitting base station 105. The reasons for the CMR 515 dropping are described herein, including with reference to FIG. 2. As depicted herein, the UE 115 may evaluate whether to generate a CSI report based on one or more rules. In some examples, the one or more rules may include one or more rules for calculating a CPU occupation, the one or more rules for calculating the CPU occupation indicating that the UE is to calculate the CPU occupation as zero if at least one reference signal or at least a threshold number of reference signals are missing from a received set of reference signals.

The one or more rules may further include one or more rules for calculating the active resource occupation or the active port occupation indicating that the UE 115 is to refrain from including at least one reference signal in calculating the active resource occupation or the active port occupation during a time period if the at least one reference signal is missing from a received set of reference signals. In some examples, the at least one reference signal may include at least one of a periodic reference signal, an aperiodic reference signal, a semi-persistent reference signal, or a combination thereof. That is, if the UE 115 determines to drop a CSI report based on the CMR 515 dropping or not receiving the CMR 515, then the one or more dropped CMRs 515 may not occupy a CPU for that CSI report setting. If, the UE 115 determines to generate a CSI report, but some of the CMRs 515 associated with the CSI report setting are dropped, then the number of occupied CPUs for the associated CSI report setting may correspond to the number of received CMRs 515 in a CSI-RS resource set 505 (e.g., the number of non-dropped CMRs 515).

In the example of periodic or semi-persistent the CMRs 515, the UE 115 may determine to refrain from counting the dropped CMRs 515 toward active resource and port occupation during that periodicity 520 of the downlink transmission 510. For example, in the downlink transmission 510-*a*, the CMR 515-*b* may be dropped by the base station 105 or otherwise not received by the UE 115, and the UE 115 may refrain from counting the CMR 515-*b* towards the number of active resources and active occupied ports for that periodicity 520. In the downlink transmission 510-*b*, all CMRs 515 may be received by the UE 115, and the UE 115 may count all the CMRs 515 in downlink transmission 510-*b* towards the active resources and the number of active ports. In the downlink transmission 510-*c*, the CMR 515-*g* and the CMR 515-*h* may be dropped by the base station 105 and the UE 115 may refrain from counting the CMR 515-*g* and the CMR 515-*h* towards the number of active resources and active ports for that periodicity 520. In some examples of active resource and active port counting, each received CMR 515 may count towards one active resource and eight active ports. In such examples, for the downlink transmission 510-*a*, the UE 115 may count two active resources and 16 active ports, for the downlink transmission 510-*b* the UE 115 may count three active resources and 24 active ports, and for the downlink transmission 510-*c* the UE 115 may count 1 active resource and 8 active ports.

In some examples, whether a UE 115 determines to count dropped CMRs 515 for a downlink transmission 510 may further depend on the reason for CMR 515 dropping. In examples of dynamic dropping (e.g., detection of a DCI at the UE 115) which results in the dropping of one or more CMRs 515, the dropped CMRs 515 may still count towards the CPU occupation, the active resources, the active port occupation, or a combination thereof. In examples of semistatic dropping (e.g., one or more CMRs 515 are dropped based on TDD configuration or other high-layer configurations), the UE 115 may refrain from counting the one or more dropped CMRs 515 towards CPU occupation, active resources, or active port occupation.

Figure 6:
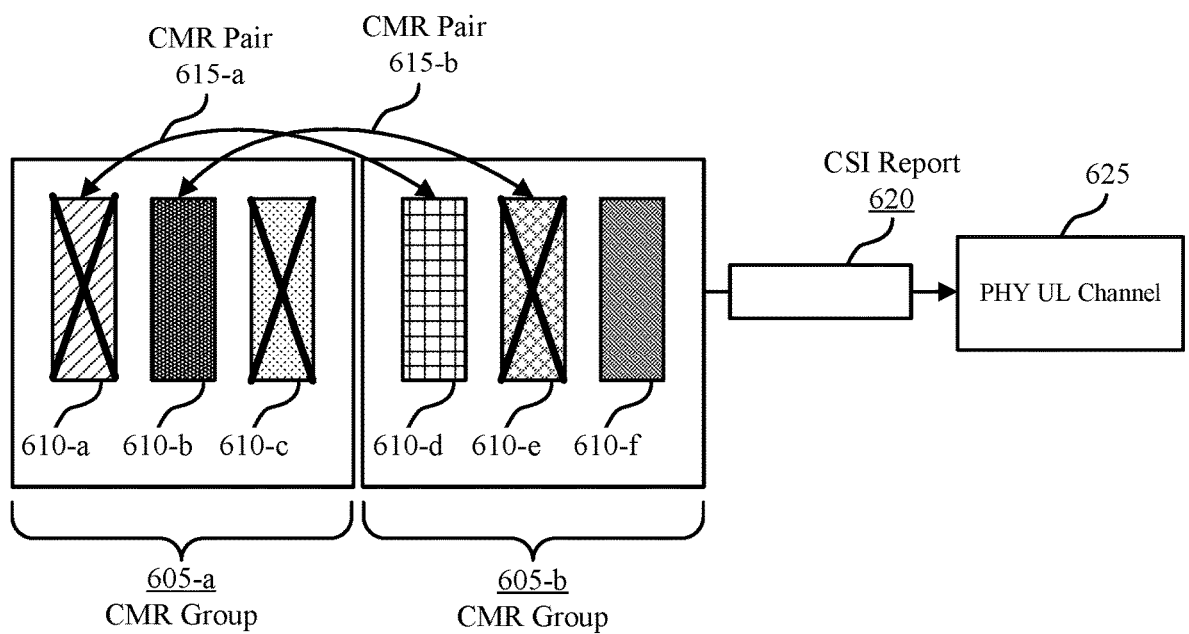
FIG. 6 illustrates an example of a non-coherent joint transmission (NCJT) CSI report generation that supports techniques for CSI reporting in accordance with aspects of the present disclosure.

FIG. 6 illustrates an example of an NCJT CSI report generation 600 that supports techniques for CSI reporting in accordance with aspects of the present disclosure. In some examples, the NCJT CSI report generation 600 may implement aspects of the wireless communications system 100 and the wireless communications system 200. The NCJT CSI report generation 600 may be implemented by a UE 115 and a base station 105, which may be examples of a UE 115 and a base station 105 as described with reference to FIGS. 1 and 2.

As depicted in the example of FIG. 6, the NCJT CSI report generation 600 may include multiple CMR groups 605 that may include multiple CMRs 610. A base station 105 may transmit the CMRs 610 to a UE 115 for CSI report 620 generation. The UE 115 may determine, using a set of configured rules, to generate one or more CSI reports 620 in accordance with receiving a subset of the anticipated CMRs 610 included in the multiple CMR groups 605. Generally, the NCJT CSI report generation 600 illustrates various implementations of the rules configured at the UE 115 for determining whether to generate one or more CSI reports 620.

In the example of NCJT CSI report generation 600, the UE 115 may determine to generate one or more CSI reports 620 that may be intended for a mTRP CSI. For example, an NCJT CSI report may relate to a CSI report 620 that is associated with a CMR pair 615 where each CMR 610 in the CMR pair 615 may have an associated TCI state and a respective TRP. For a CSI-RS resource set within a given CSI report setting the base station 105 may configure one or more CMR pairs 615 for one or more NCJT CSI hypotheses. For example, CMR pair 615-*a* may include CMR 610-*a* and CMR 610-*d* and CMR pair 615-*b* may include CMR 610-*b* and CMR 610-*e* in which CMR pair 615-*a* and CMR pair 615-*b* are associated with a respective NCJT hypothesis. The CMRs 610 may be divided into two CMR groups 605 such that each CMR pair 615-*a* associated with an NCJT hypothesis may include one CMR 610 from the CMR group 605-*a* and one CMR 610 from the CMR group 605-*b*. In some examples, out of N possible CMR pairs 615 the UE 115 may configure N different NCJT hypotheses.

In some examples, each CMR 610 may be used for both an NCJT hypothesis and a single-TRP hypothesis. Additionally or alternatively, each CMR 610 may be used for either an NCJT hypothesis or individually for a single-TRP hypothesis. For a given CSI report setting, the UE 115 may be configured with both NCJT hypotheses and sTRP hypotheses. For example, in the NCJT CSI report generation 600, the CMR group 605-*a* and the CMR group 605-*b* may be included in two NCJT hypotheses (e.g., CMR pair 605-*a* and CMR pair 605-*b*) and two single-TRP hypotheses (e.g., CMR 610-*c* and CMR 610-*f*) for a total of four CSI hypotheses.

To generate one or more CSI reports 620, the UE 115 may operate in accordance with one or more options which may indicate how the UE 115 may generate the one or more CSI reports 620. In one example (e.g., Option 1), the UE 115 may separate the NCJT hypotheses from the single-TRP hypotheses and may generate one CSI report 620 from the set of configured NCJT hypotheses. For example, the UE 115 may choose either the CMR pair 615-*a* or the CMR pair 615-*b* based on the CMR pairs 615 satisfying one or more configured criteria for signal quality and use the chosen CMR pair 605 to generate an mTRP CSI report 620. Additionally, or alternatively in this example, the UE 115 may configure an additional CSI report 620 for each single-TRP hypothesis. For instance, the UE 115 may generate a CSI report 620 associated with the CMR 610-*c* and another CSI report 620 associated with the CMR 610-*f* totaling three CSI reports 620 (e.g., one NCJT CSI report and two sTRP CSI reports). In another example (e.g., Option 2), the UE 115 may generate one CSI report for the CSI hypothesis that satisfies one or more signal quality criteria configured at the UE 115. For example, the UE 115 may choose from one of the four hypotheses as illustrated in NCJT CSI report generation 600 to generate one CSI report 620.

In some cases of NCJT CSI report generation 600, the base station 105 may drop one or more CSI-RS resources intended for one or more CSI report 620 generations. For example, the base station 105 may drop the CMR 610-*a* and the CMR 610-*c* in the CMR group 605-*a* and the CMR 610-*e* in the CMR group 605-*b*. For an NCJT hypothesis associated with a CMR pair 615 in a given CSI report setting, if at least one of the two CMRs 610 is dropped, the UE 115 refrains from evaluating or considering the associated NCJT CSI hypothesis. For example, because the CMR 610-*a* in the CMR pair 615-*a* may be dropped by the base station 105, the UE 115 may drop the NCJT hypothesis associated with the CMR pair 615-*a* and refrain from counting CMR pair 615-*a* toward the CPU occupation. If the CMR 610-*d* is not configured in a CMR pair 615 other that the CMR pair 615-*a* and is not configured as a single-TRP hypothesis, the UE 115 may also determine to drop the CMR 610-*d*.

In cases in which the UE 115 determines to generate one CSI report 620 based on the CSI hypothesis that satisfies signal quality criteria (e.g., Option 2), the UE 115 may operate in accordance with a set of rules to determine whether to generate a CSI report 620 if the base station 105 drops one or more CMRs 610. In one example, the UE 115 may determine to drop the one CSI report 620 if all associated CSI hypotheses are dropped. In the context NCJT CSI report generation 600 under this example, the UE 115 may determine to generate the CSI report 620 based on receiving CMR 610-*f* which has an associated single-TRP CSI hypothesis. In another example, the UE 115 may determine to drop the one CSI report 620 if at least one associated CSI hypothesis is dropped. In the context of NCJT CSI report generation 600 under this example, the UE 115 may determine to refrain from generating the CSI report 620 based determining that the CMR pair 615-*a*, the CMR pair 615-*b*, and the CMR 610-*c* are dropped. In another example, the UE 115 may determine drop the CSI report 620 if the number of CSI hypothesis dropped is above a configured threshold. In the context of NCJT CSI report generation 600 under this example, the UE 115 may determine to refrain from generating the one CSI report 620 if the number of dropped CSI hypotheses (e.g., three) is greater than the configured threshold and may generate the one CSI report if the number of dropped CSI hypotheses is less than the configured threshold.

In cases where the UE 115 determines to generate a CSI report 620 per received CSI hypothesis (e.g., Option 1), the UE 115 may determine whether to generate each CSI report 620 based on receiving the respective CSI hypothesis. In the example of the CMR pair 615-*a*, the UE 115 may determine to drop the CSI report 620 based on the associated NCJT hypothesis being dropped. In the example of the CMR pair 615-*b*, the UE 115 may determine to drop the CSI report 620 based on the associated NCJT hypothesis being dropped. In the example of the CMR 610-*c*, the UE 115 may determine to drop the associated CSI report 620 based on the associated single-TRP CSI hypothesis being dropped. In the example of the CMR 610-*f*, the UE 115 may generate the associated CSI report 620 based on receiving the associated single-TRP CSI hypothesis. That is, of the four CSI report hypotheses, the UE 115 may determine to drop three of the associated CSI reports 620 and include one CSI report 620 on the physical uplink channel 625. In some other examples, the UE 115 may determine to transmit one or more of the CSI reports 620 based on dropping other CSI hypotheses (e.g., the UE 115 refrains from partial dropping of CSI reports 620). In one example, the UE 115 may refrain from generating any CSI reports 620 if all associated CSI hypotheses are dropped. In another example, the UE 115 may refrain from generating any CSI report 620 if at least one associated CSI hypotheses is dropped. In the context of NCJT CSI report generation 600 under this example, the UE 115 may refrain from generating any CSI report 620 based on at least the CMR pair 615-*a*, the CMR pair 615-*b*, or the CMR 610-*c* being dropped. In another example, the UE 115 may refrain from generating any CSI report 620 if the number of dropped CSI hypotheses is above a configured threshold. In the context of NCJT CSI report generation 600 under this example, the UE 115 may refrain from generating the any CSI report 620 if the number of dropped CSI hypotheses (e.g., three) is greater than the configured threshold and may generate the CSI reports 620 associated with any received CSI hypotheses if the number of dropped CSI hypotheses is less than the configured threshold.

Figure 7:
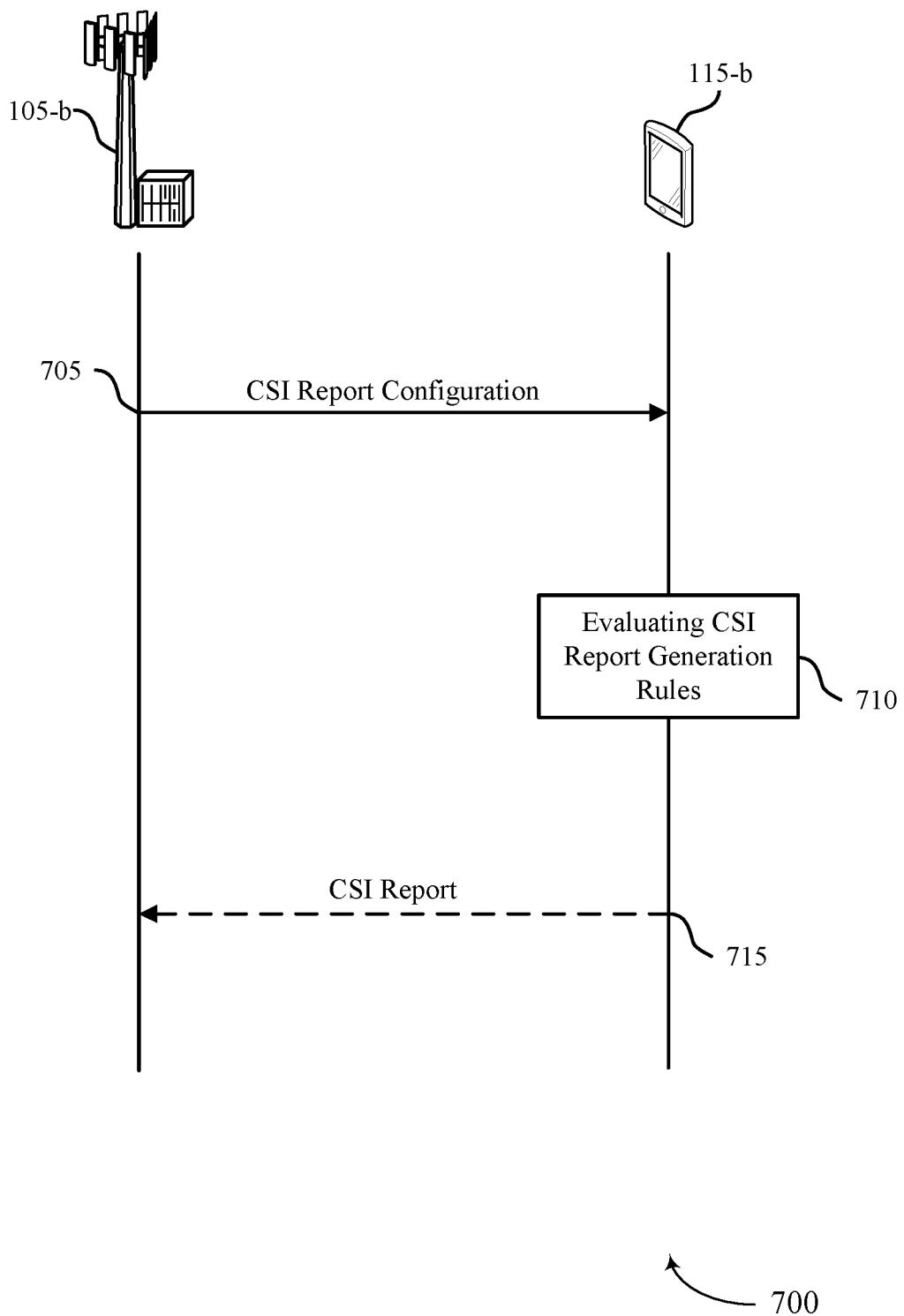
FIG. 7 illustrates an example of a process flow that supports techniques for CSI reporting in accordance with aspects of the present disclosure.

FIG. 7 illustrates an example of a process flow 700 that supports techniques for CSI reporting in accordance with aspects of the present disclosure. In some examples, the process flow 700 may implement aspects of the wireless communications system 100 and the wireless communications system 200. Process flow 700 includes a UE 115-*b* and a base station 105-*b*, which may be respective examples of a UE 115 and a base station 105 as described with reference to FIGS. 1 and 2.

Alternative examples of the following may be implemented, where some steps are performed in a different order than described or are not performed at all. In some cases, steps may include additional features not mentioned below, or further steps may be added. In addition, while process flow 700 shows processes between a single base station 105-*b* and UE 115-*b*, it should be understood that these processes may occur between any number of network devices.

At 705, the UE 115-*b* may receive, from the base station 105-*b*, a signal indicating a configuration for the UE 115-*b* to report CSI corresponding to a first set of reference signals. In some examples, at least on reference signal of the set of reference signals may include a periodic reference signal, an aperiodic reference signal, a semi-persistent reference signal, or a combination thereof. In some examples, at least one reference signal from the first set of reference signals may be missing from the received set of reference signals. For example, a reference signal may be missing based on an LBT failure in unlicensed band, an uplink and downlink symbol conflict, a resource overlap with a downlink channel, or a combination thereof. An uplink and downlink symbol conflict may be based on detection of a DCI scheduling an uplink signal, an SFI, an overlap between a PRACH occasion and a gap symbol prior to the PRACH occasion, or a combination thereof. A resource overlap with the downlink channel may be determined based on a channel type, a priority of the downlink channel compared to a priority of the CSI resource, a scheduling of the downlink channel, or a combination thereof.

At 710, the UE 115-*b* may evaluate one or more rules for generating a CSI report where the one or more rules are associated with CSI report generation for when a received set of reference signals is less than the first set of reference signals. In some examples, the one or more rules may indicate that the UE 115-*b* may refrain from generating the CSI report if none of the reference signals from the first set of reference signals are in the received set of reference signals. In some examples, the one or more rules may indicate that the UE 115-*b* may refrain from generating the CSI report if at least one reference signal from the first set of reference signals is missing from the received set of reference signals. In some examples, the one or more rules may indicate that the UE 115-*b* may refrain from generating the CSI report if at least a threshold number of reference signals from the first set of reference signals is missing from the received set of reference signals.

In some examples, the one or more rules may indicate to the UE 115-*b* to calculate the CPU occupation based on the received set of reference signals if at least one reference signal from the first set of reference signals is missing from the received set of reference signals. In some examples, the rules for calculating the CPU occupation may indicate that the UE 115-*b* may calculate the CPU occupation as zero if at least one reference signal from the first set of reference signals is missing from the received set of reference signals. In some examples, the rules may indicate that the UE 115-*b* may calculate the CSI processing unit occupation based on the received set of reference signals if at least a threshold number of reference signals from the first set of reference signals is missing from the received set of reference signals.

In some examples, the one or more rules may include one or more rules for calculating an active resource occupation or an active port occupation. For example, the one or more rules may indicate that the UE 115-*b* may refrain from including at least one reference signal in calculating the active resource occupation or the active port occupation during a time period if the at least one reference signal from the first set of reference signals is missing from the received set of reference signals. In some examples, the one or more rules for calculating the active resource occupation may indicate to the UE 115-*b* to refrain from including at least one reference signal in calculating the active resource occupation if the at least one reference signal from the first set of reference signals is missing from the received set of reference signals.

In some examples, a first CSI hypothesis may correspond to a reference signal from the first set of reference signals and a second CSI hypothesis may correspond to a pair of reference signals from the first set of reference signals. In such examples, the one or more rules may indicate that the UE 115-*b* may refrain from evaluating the second CSI hypothesis if a first reference signal from the pair of reference signals is missing from the received set of reference signals. In some examples, the one or more rules indicate that the UE 115-*b* is to refrain from evaluating the second CSI hypothesis if a second reference signal from the pair of reference signals does not correspond to the first CSI hypothesis or is not included in a second pair of reference signals corresponding to the second CSI hypothesis.

In some examples, the one or more rules may indicate that the UE 115-*b* may refrain from generating the CSI report if the reference signal from the first set of reference signals and a second reference signal from the pair of reference signals are missing from the received set of reference signals. In some examples, the one or more rules may indicate that the UE 115-*b* may refrain from generating the CSI report if the at least one of the reference signal from the first set of reference signals and a second reference signal from the pair of reference signals are missing from the received set of reference signals. In some examples, the one or more rules may indicate that the UE 115-*b* may refrain from generating the CSI report if at least a threshold number of reference signals from the first set of reference signals is missing from the received set of reference signals, the threshold number of reference signals corresponding to the first CSI hypothesis, or the second CSI hypothesis, or both.

In some examples, the one or more rules may indicate that the UE 115-*b* may refrain from generating the CSI report if at least one reference signal from the first set of reference signals is missing from the received set of reference signals and that the UE 115-*b* may generate a plurality of CSI reports corresponding to a remaining number of reference signals of the first set of reference signals.

In some examples, the one or more rules indicate that the UE 115-*b* is to refrain from transmitting an uplink channel if the UE 115-*b* refrains from generating the CSI report. In some examples, the one or more rules indicate that the UE 115-*b* is to transmit an uplink channel including an UCI or an uplink transport block if the UE 115-*b* refrains from generating the CSI report.

At 715, the UE 115-*b* may perform CSI operations according to the one or more rules evaluated by the UE 115-*b* at 710. For example, the UE 115-*b* may determine whether to generate and transmit a CSI report based on the one or more rules. In some cases, as described above, the process of performing CSI operations may include determining not to generate CSI report based on the rules.

Figure 8:
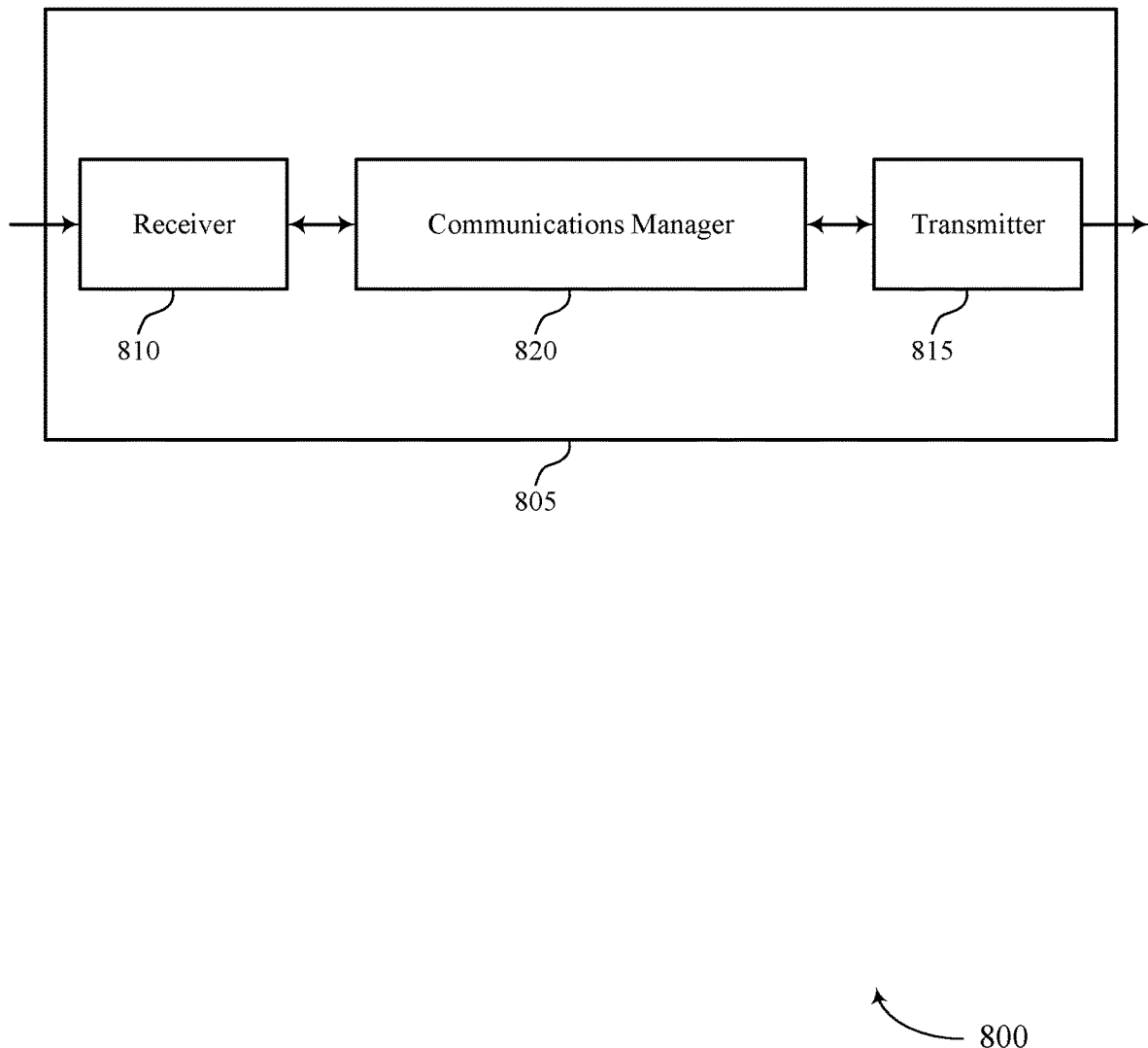
FIGS. 8 and 9 show block diagrams of devices that support techniques for CSI reporting in accordance with aspects of the present disclosure.

FIG. 8 shows a block diagram 800 of a device 805 that supports techniques for CSI reporting in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for CSI reporting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for CSI reporting). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for CSI reporting as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a signal indicating a configuration for the UE to report CSI corresponding to a first set of reference signals. The communications manager 820 may be configured as or otherwise support a means for evaluating one or more rules for generating a CSI report where the one or more rules are associated with CSI report generation for when a received set of reference signals is less than the first set of reference signals. The communications manager 820 may be configured as or otherwise support a means for performing CSI operations according to the one or more rules.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption at CPUs, more efficient utilization of CSI resources for CSI report generation, decrease in resource port occupations.

Figure 9:
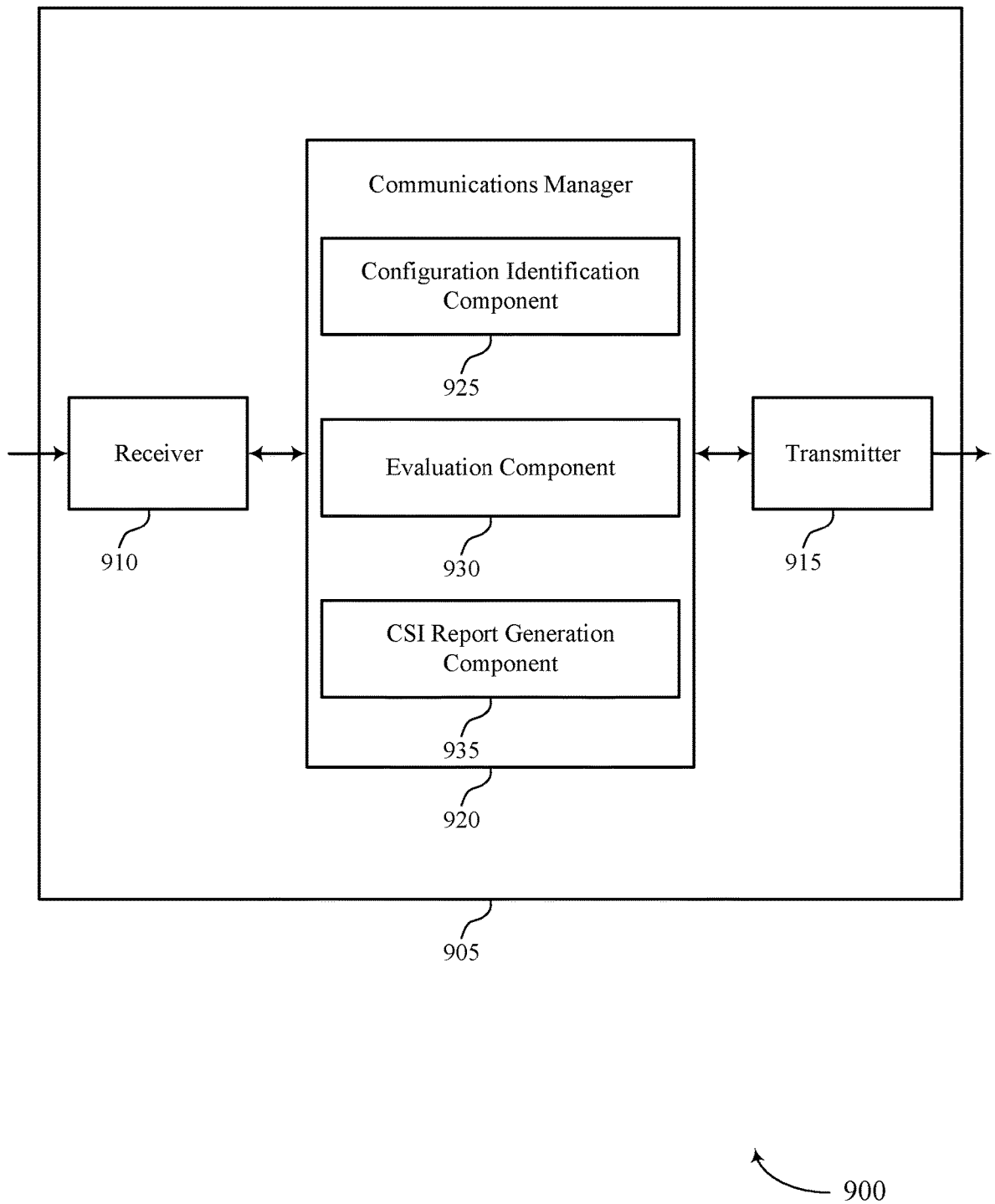

FIG. 9 shows a block diagram 900 of a device 905 that supports techniques for CSI reporting in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for CSI reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for CSI reporting). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for CSI reporting as described herein. For example, the communications manager 920 may include a configuration identification component 925, an evaluation component 930, a CSI report generation component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The configuration identification component 925 may be configured as or otherwise support a means for receiving, from a base station, a signal indicating a configuration for the UE to report CSI corresponding to a first set of reference signals. The evaluation component 930 may be configured as or otherwise support a means for evaluating one or more rules for generating a CSI report where the one or more rules are associated with CSI report generation for when a received set of reference signals is less than the first set of reference signals. The CSI report generation component 935 may be configured as or otherwise support a means for performing CSI operations according to the one or more rules.

Figure 10:
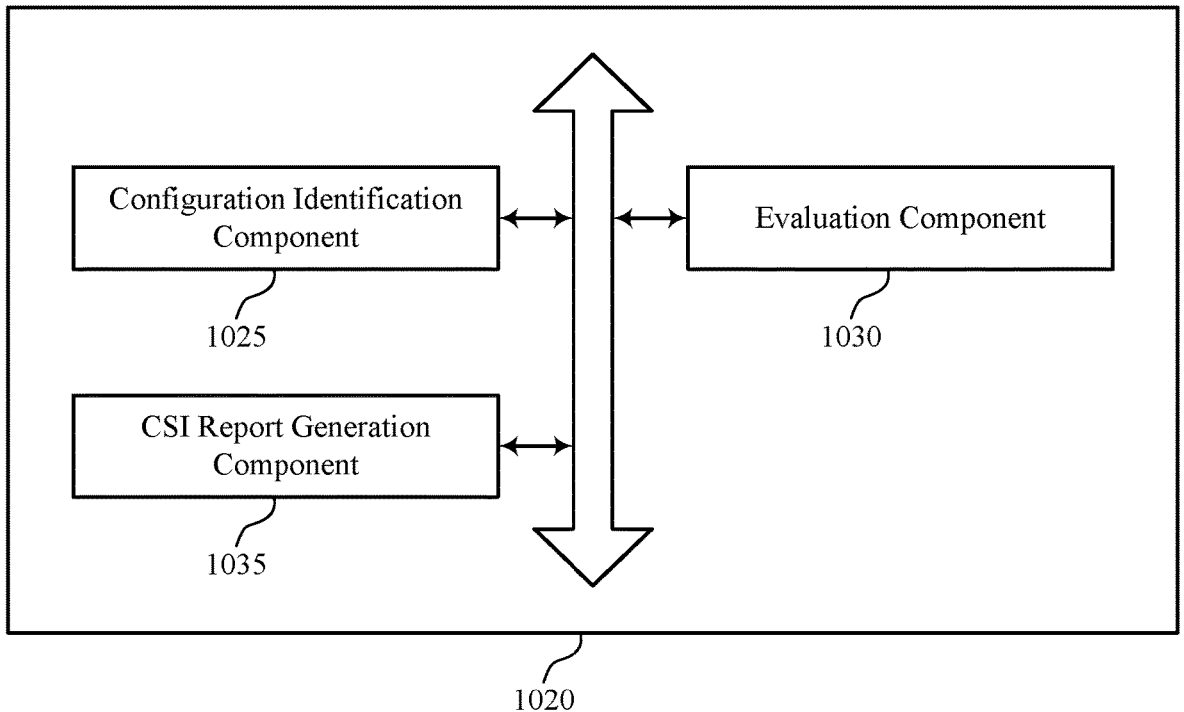
FIG. 10 shows a block diagram of a communications manager that supports techniques for CSI reporting in accordance with aspects of the present disclosure.

FIG. 10 shows a block diagram 1000 of a communications manager 1020 that supports techniques for CSI reporting in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for CSI reporting as described herein. For example, the communications manager 1020 may include a configuration identification component 1025, an evaluation component 1030, a CSI report generation component 1035, or any combination thereof. Each of these components may communicate, directly or indirectly, with one another (e.g., via one or more buses).

The communications manager 1020 may support wireless communications at a UE in accordance with examples as disclosed herein. The configuration identification component 1025 may be configured as or otherwise support a means for receiving, from a base station, a signal indicating a configuration for the UE to report CSI corresponding to a first set of reference signals. The evaluation component 1030 may be configured as or otherwise support a means for evaluating one or more rules for generating a CSI report where the one or more rules are associated with CSI report generation for when a received set of reference signals is less than the first set of reference signals. The CSI report generation component 1035 may be configured as or otherwise support a means for performing CSI operations according to the one or more rules.

In some examples, the one or more rules indicate that the UE is to refrain from generating the CSI report if none of the reference signals from the first set of reference signals are in the received set of reference signals. In some examples, the one or more rules indicate that the UE is to refrain from generating the CSI report if at least one reference signal from the first set of reference signals is missing from the received set of reference signals.

In some examples, the one or more rules indicate that the UE is to refrain from generating the CSI report if at least a threshold number of reference signals from the first set of reference signals is missing from the received set of reference signals. In some examples, the one or more rules include one or more rules for calculating a CPU occupation, the one or more rules for calculating the CPU occupation indicating that the UE is to calculate the CPU occupation as zero if at least one reference signal from the first set of reference signals is missing from the received set of reference signals.

In some examples, the one or more rules include one or more rules for calculating a CPU occupation, the one or more rules for calculating the CPU occupation indicating that the UE is to calculate the CPU occupation based on the received set of reference signals if at least one reference signal from the first set of reference signals is missing from the received set of reference signals.

In some examples, the one or more rules include one or more rules for calculating a CPU occupation, the one or more rules for calculating the CPU occupation indicating that the UE is to calculate the CPU occupation based on the received set of reference signals if at least a threshold number of reference signals from the first set of reference signals is missing from the received set of reference signals.

In some examples, the one or more rules include one or more rules for calculating an active resource occupation or an active port occupation, the one or more rules for calculating the active resource occupation or the active port occupation indicating that the UE is to refrain from including at least one reference signal in calculating the active resource occupation or the active port occupation during a time period if the at least one reference signal from the first set of reference signals is missing from the received set of reference signals.

In some examples, the at least one reference signal includes at least one of a periodic reference signal, an aperiodic reference signal, a semi-persistent reference signal, or a combination thereof. In some examples, the one or more rules include one or more rules for calculating an active resource occupation, the one or more rules for calculating the active resource occupation indicating that the UE is to refrain from including at least one reference signal in calculating the active resource occupation if the at least one reference signal from the first set of reference signals is missing from the received set of reference signals.

In some examples, a first CSI hypothesis corresponds to a reference signal from the first set of reference signals and a second CSI hypothesis corresponds to a pair of reference signals from the first set of reference signals. In some examples, the one or more rules indicate that the UE is to refrain from evaluating the second CSI hypothesis if a first reference signal from the pair of reference signals is missing from the received set of reference signals.

In some examples, the one or more rules indicate that the UE is to refrain from evaluating the second CSI hypothesis if a second reference signal from the pair of reference signals does not correspond to the first CSI hypothesis or is not included in a second pair of reference signals corresponding to the second CSI hypothesis.

In some examples, the one or more rules indicate that the UE is to refrain from generating the CSI report if the reference signal from the first set of reference signals and a second reference signal from the pair of reference signals are missing from the received set of reference signals. In some examples, the one or more rules indicate that the UE is to refrain from generating the CSI report if the at least one of the reference signal from the first set of reference signals and a second reference signal from the pair of reference signals are missing from the received set of reference signals.

In some examples, the one or more rules indicate that the UE is to refrain from generating the CSI report if at least a threshold number of reference signals from the first set of reference signals is missing from the received set of reference signals, the threshold number of reference signals corresponding to the first CSI hypothesis, or the second CSI hypothesis, or both.

In some examples, the one or more rules indicate that the UE is to refrain from generating the CSI report if at least one reference signal from the first set of reference signals is missing from the received set of reference signals and that the UE is to generate a set of multiple CSI reports corresponding to a remaining number of reference signals of the first set of reference signals.

In some examples, the one or more rules indicate that the UE is to refrain from transmitting an uplink channel if the UE refrains from generating the CSI report. In some examples, the one or more rules indicate that the UE is to transmit an uplink channel including an UCI or an uplink transport block if the UE refrains from generating the CSI report.

In some examples, at least one reference signal from the first set of reference signals is missing from the received set of reference signals based on a listen before talk failure in unlicensed band, an uplink and downlink symbol conflict, a resource overlap with a downlink channel, or a combination thereof.

In some examples, the uplink and downlink symbol conflict is based on detection of at least one of a downlink control information scheduling uplink signal, a slot format indicator, an overlap between a physical random access channel occasion and a gap symbol prior to the physical random access channel occasion, or a combination thereof. In some examples, the resource overlap with the downlink channel is determined based on a channel type, a priority of downlink channel compared to a priority of the CSI resource, a scheduling of the downlink channel, or a combination thereof.

Figure 11:
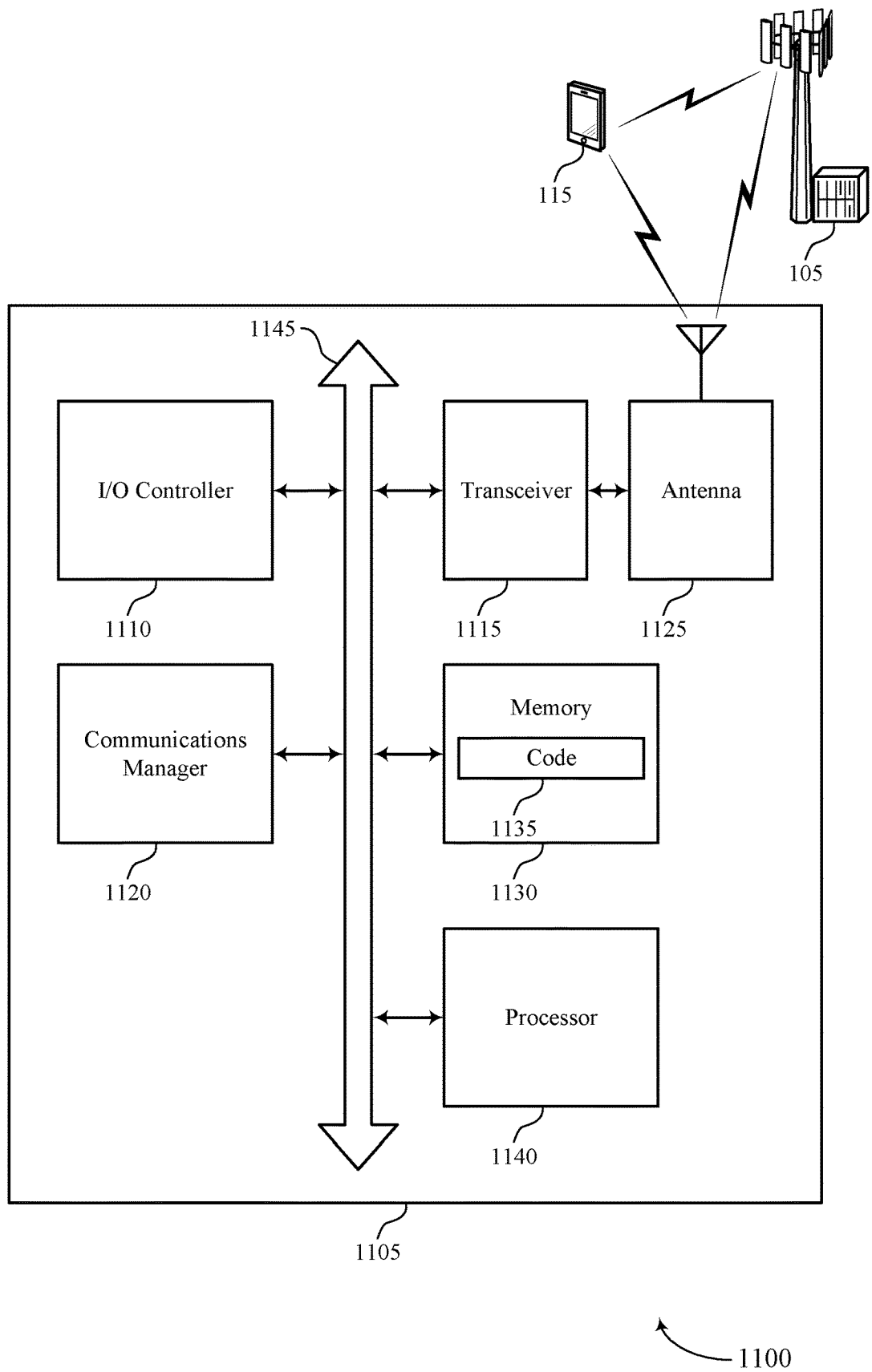
FIG. 11 shows a diagram of a system including a device that supports techniques for CSI reporting in accordance with aspects of the present disclosure.

FIG. 11 shows a diagram of a system 1100 including a device 1105 that supports techniques for CSI reporting in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for CSI reporting). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, a signal indicating a configuration for the UE to report CSI corresponding to a first set of reference signals. The communications manager 1120 may be configured as or otherwise support a means for evaluating one or more rules for generating a CSI report where the one or more rules are associated with CSI report generation for when a received set of reference signals is less than the first set of reference signals. The communications manager 1120 may be configured as or otherwise support a means for performing CSI operations according to the one or more rules.

By including or configuring the communications manager 1120 in accordance with examples as described herein, the device 1105 may support techniques for a decrease in physical channel occupation by CSI reports, reduced signaling overhead for transmissions associated with CSI, reduced power consumption at CPUs, improved channel estimation coordination between network device, and improved utilization of port occupation.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for CSI reporting as described herein, or the processor 1140 and the memory 1130 may be otherwise configured to perform or support such operations.

Figure 12:
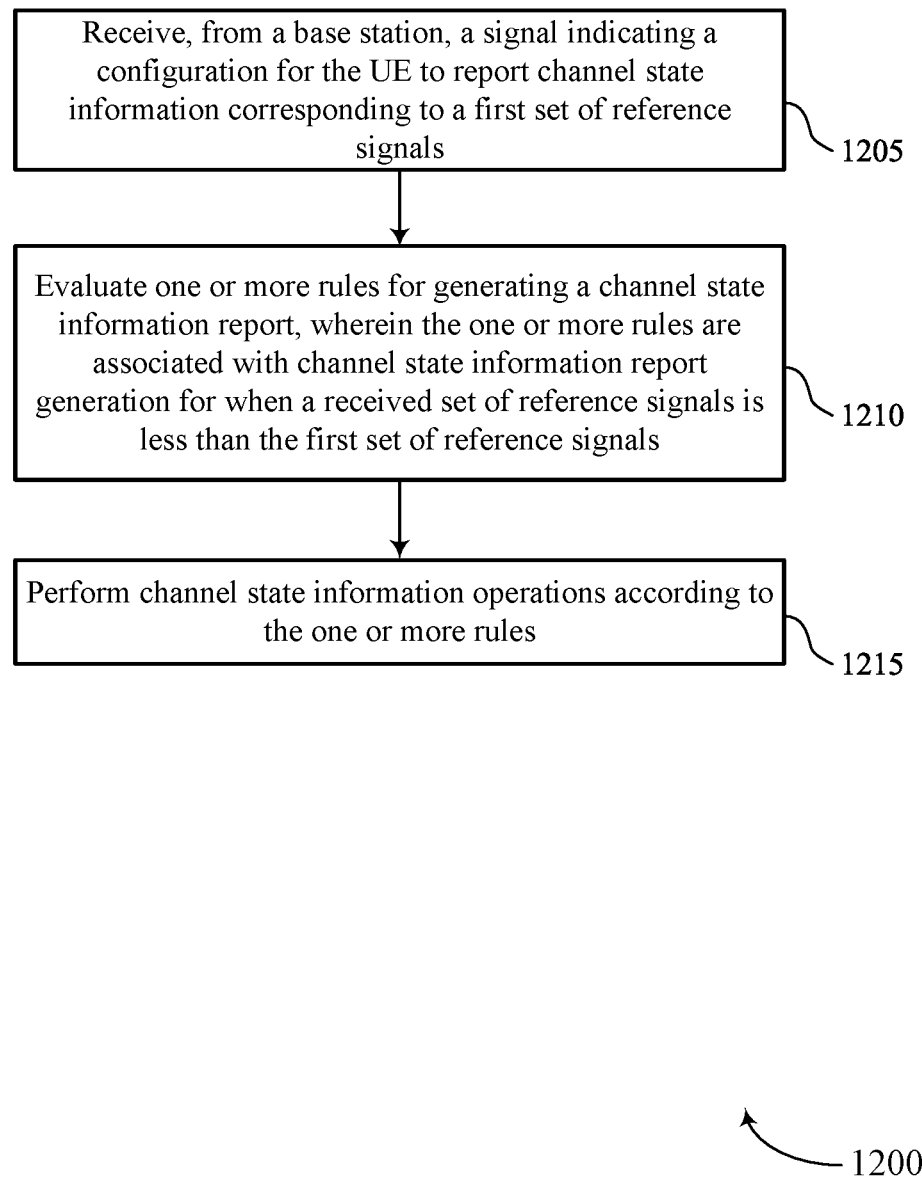
FIG. 12 shows a flowchart illustrating methods that support techniques for CSI reporting in accordance with aspects of the present disclosure.

FIG. 12 shows a flowchart illustrating a method 1200 that supports techniques for CSI reporting in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a signal indicating a configuration for the UE to report CSI corresponding to a first set of reference signals. The operations of 1205 may be performed in accordance with examples as disclosed herein. In some examples, aspects of the operations of 1205 may be performed by a configuration identification component 1025 as described with reference to FIG. 10.

At 1210, the method may include evaluating one or more rules for generating a CSI report where the one or more rules are associated with CSI report generation for when a received set of reference signals is less than the first set of reference signals. The operations of 1210 may be performed in accordance with examples as disclosed herein. In some examples, aspects of the operations of 1210 may be performed by an evaluation component 1030 as described with reference to FIG. 10.

At 1215, the method may include performing CSI operations according to the one or more rules. The operations of 1215 may be performed in accordance with examples as disclosed herein. In some examples, aspects of the operations of 1215 may be performed by a CSI report generation component 1035 as described with reference to FIG. 10.

The following provides an overview of aspects of the present disclosure:

Aspect 1: A method for wireless communications at a UE, comprising: receiving, from a base station, a signal indicating a configuration for the UE to report CSI corresponding to a first set of reference signals; evaluating one or more rules for generating a CSI report where the one or more rules are associated with CSI report generation for when a received set of reference signals is less than the first set of reference signals; and performing CSI operations according to the one or more rules.

Aspect 2: The method of aspect 1, wherein the one or more rules indicate that the UE is to refrain from generating the CSI report if none of the reference signals from the first set of reference signals are in the received set of reference signals.

Aspect 3: The method of any of aspects 1 through 2, wherein the one or more rules indicate that the UE is to refrain from generating the CSI report if at least one reference signal from the first set of reference signals is missing from the received set of reference signals.

Aspect 4: The method of any of aspects 1 through 3, wherein the one or more rules indicate that the UE is to refrain from generating the CSI report if at least a threshold number of reference signals from the first set of reference signals is missing from the received set of reference signals.

Aspect 5: The method of any of aspects 1 through 4, wherein the one or more rules comprise one or more rules for calculating a CPU occupation, the one or more rules for calculating the CPU occupation indicating that the UE is to calculate the CPU occupation as zero if at least one reference signal from the first set of reference signals is missing from the received set of reference signals.

Aspect 6: The method of any of aspects 1 through 5, wherein the one or more rules comprise one or more rules for calculating a CPU occupation, the one or more rules for calculating the CPU occupation indicating that the UE is to calculate the CPU occupation based at least in part on the received set of reference signals if at least one reference signal from the first set of reference signals is missing from the received set of reference signals.

Aspect 7: The method of any of aspects 1 through 6, wherein the one or more rules comprise one or more rules for calculating a CPU occupation, the one or more rules for calculating the CPU occupation indicating that the UE is to calculate the CPU occupation based at least in part on the received set of reference signals if at least a threshold number of reference signals from the first set of reference signals is missing from the received set of reference signals.

Aspect 8: The method of any of aspects 1 through 7, wherein the one or more rules comprise one or more rules for calculating an active resource occupation or an active port occupation, the one or more rules for calculating the active resource occupation or the active port occupation indicating that the UE is to refrain from including at least one reference signal in calculating the active resource occupation or the active port occupation during a time period if the at least one reference signal from the first set of reference signals is missing from the received set of reference signals.

Aspect 9: The method of aspect 8, wherein the at least one reference signal comprises at least one of a periodic reference signal, an aperiodic reference signal, a semi-persistent reference signal, or a combination thereof.

Aspect 10: The method of any of aspects 1 through 9, wherein the one or more rules comprise one or more rules for calculating an active resource occupation, the one or more rules for calculating the active resource occupation indicating that the UE is to refrain from including at least one reference signal in calculating the active resource occupation if the at least one reference signal from the first set of reference signals is missing from the received set of reference signals.

Aspect 11: The method of any of aspects 1 through 10, wherein a first CSI hypothesis corresponds to a reference signal from the first set of reference signals and a second CSI hypothesis corresponds to a pair of reference signals from the first set of reference signals.

Aspect 12: The method of aspect 11, wherein the one or more rules indicate that the UE is to refrain from evaluating the second CSI hypothesis if a first reference signal from the pair of reference signals is missing from the received set of reference signals.

Aspect 13: The method of aspect 12, wherein the one or more rules indicate that the UE is to refrain from evaluating the second CSI hypothesis if a second reference signal from the pair of reference signals does not correspond to the first CSI hypothesis or is not included in a second pair of reference signals corresponding to the second CSI hypothesis.

Aspect 14: The method of any of aspects 11 through 13, wherein the one or more rules indicate that the UE is to refrain from generating the CSI report if the reference signal from the first set of reference signals and a second reference signal from the pair of reference signals are missing from the received set of reference signals.

Aspect 15: The method of any of aspects 11 through 14, wherein the one or more rules indicate that the UE is to refrain from generating the CSI report if the at least one of the reference signal from the first set of reference signals and a second reference signal from the pair of reference signals are missing from the received set of reference signals.

Aspect 16: The method of any of aspects 11 through 15, wherein the one or more rules indicate that the UE is to refrain from generating the CSI report if at least a threshold number of reference signals from the first set of reference signals is missing from the received set of reference signals, the threshold number of reference signals corresponding to the first CSI hypothesis, or the second CSI hypothesis, or both.

Aspect 17: The method of any of aspects 1 through 16, wherein the one or more rules indicate that the UE is to refrain from generating the CSI report if at least one reference signal from the first set of reference signals is missing from the received set of reference signals and that the UE is to generate a plurality of CSI reports corresponding to a remaining number of reference signals of the first set of reference signals.

Aspect 18: The method of any of aspects 1 through 17, wherein the one or more rules indicate that the UE is to refrain from transmitting an uplink channel if the UE refrains from generating the CSI report.

Aspect 19: The method of any of aspects 1 through 18, wherein the one or more rules indicate that the UE is to transmit an uplink channel including an uplink control information or an uplink transport block if the UE refrains from generating the CSI report.

Aspect 20: The method of any of aspects 1 through 19, wherein at least one reference signal from the first set of reference signals is missing from the received set of reference signals based at least in part on a listen before talk failure in unlicensed band, an uplink and downlink symbol conflict, a resource overlap with a downlink channel, or a combination thereof.

Aspect 21: The method of aspect 20, wherein the uplink and downlink symbol conflict is based at least in part on detection of at least one of a DCI scheduling uplink signal, a slot format indicator, an overlap between a PRACH occasion and a gap symbol prior to the PRACH occasion, or a combination thereof.

Aspect 22: The method of any of aspects 20 through 21, wherein the resource overlap with the downlink channel is determined based at least in part on a channel type, a priority of downlink channel compared to a priority of the CSI resource, a scheduling of the downlink channel, or a combination thereof.

Aspect 23: An apparatus for wireless communications at a UE, comprising a processor; memory coupled with the processor; and instructions stored in the memory and executable by the processor to cause the apparatus to perform a method of any of aspects 1 through 22.

Aspect 24: An apparatus for wireless communications at a UE, comprising at least one means for performing a method of any of aspects 1 through 22.

Aspect 25: A non-transitory computer-readable medium storing code for wireless communications at a UE, the code comprising instructions executable by a processor to perform a method of any of aspects 1 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, a signal indicating a configuration for the UE to generate a channel state information report corresponding to a first set of reference signals, wherein a first quantity of channel state information processing units at the UE are associated with the first set of reference signals;
   evaluating one or more rules for generating the channel state information report, wherein the one or more rules are associated with channel state information report generation for when a received set of reference signals for the channel state information report is less than the first set of reference signals; and
   performing channel state information operations according to the one or more rules, wherein performing the channel state information operations occupies, in accordance with the one or more rules, a second quantity of channel state information processing units that is less than the first quantity of channel state information processing units based at least in part on the received set of reference signals for the channel state information report being less than the first set of reference signals.

2. The method of claim 1, wherein the one or more rules indicate that the UE is to refrain from generating the channel state information report if none of the reference signals from the first set of reference signals are in the received set of reference signals.

3. The method of claim 1, wherein the one or more rules indicate that the UE is to refrain from generating the channel state information report if at least one reference signal from the first set of reference signals is missing from the received set of reference signals.

4. The method of claim 1, wherein the one or more rules indicate that the UE is to refrain from generating the channel state information report if at least a threshold number of reference signals from the first set of reference signals is missing from the received set of reference signals.

5. The method of claim 1, wherein the one or more rules comprise one or more rules for calculating the second quantity of channel state information processing units for occupation at the UE, the one or more rules indicating that the UE is to calculate the second quantity of channel state information processing units as zero if at least one reference signal from the first set of reference signals is missing from the received set of reference signals.

6. The method of claim 1, wherein the one or more rules comprise one or more rules for calculating the second quantity of channel state information processing units for occupation at the UE, the one or more rules indicating that the UE is to calculate the second quantity of channel state information processing units based at least in part on a quantity of the received set of reference signals if at least one reference signal from the first set of reference signals is missing from the received set of reference signals.

7. The method of claim 1, wherein the one or more rules comprise one or more rules for calculating the second quantity of channel state information processing units for occupation at the UE, the one or more rules indicating that the UE is to calculate the second quantity of channel state information processing units based at least in part on a quantity of the received set of reference signals if at least a threshold number of reference signals from the first set of reference signals is missing from the received set of reference signals.

8. The method of claim 1, wherein the one or more rules comprise one or more rules for calculating an active resource occupation or an active port occupation, the one or more rules for calculating the active resource occupation or the active port occupation indicating that the UE is to refrain from including at least one reference signal in calculating the active resource occupation or the active port occupation during a time period if the at least one reference signal from the first set of reference signals is missing from the received set of reference signals.

9. The method of claim 8, wherein the at least one reference signal comprises at least one of a periodic reference signal, an aperiodic reference signal, a semi-persistent reference signal, or a combination thereof.

10. The method of claim 1, wherein the one or more rules comprise one or more rules for calculating an active resource occupation, the one or more rules for calculating the active resource occupation indicating that the UE is to refrain from including at least one reference signal in calculating the active resource occupation if the at least one reference signal from the first set of reference signals is missing from the received set of reference signals.

11. The method of claim 1, wherein a first channel state information hypothesis corresponds to a reference signal from the first set of reference signals and a second channel state information hypothesis corresponds to a pair of reference signals from the first set of reference signals.

12. The method of claim 11, wherein the one or more rules indicate that the UE is to refrain from evaluating the second channel state information hypothesis if a first reference signal from the pair of reference signals is missing from the received set of reference signals.

13. The method of claim 12, wherein the one or more rules indicate that the UE is to refrain from evaluating the second channel state information hypothesis if a second reference signal from the pair of reference signals does not correspond to the first channel state information hypothesis or is not included in a second pair of reference signals corresponding to the second channel state information hypothesis.

14. The method of claim 11, wherein the one or more rules indicate that the UE is to refrain from generating the channel state information report if the reference signal from the first set of reference signals and a second reference signal from the pair of reference signals are missing from the received set of reference signals.

15. The method of claim 11, wherein the one or more rules indicate that the UE is to refrain from generating the channel state information report if at least one reference signal from the first set of reference signals and a second reference signal from the pair of reference signals are missing from the received set of reference signals.

16. The method of claim 11, wherein the one or more rules indicate that the UE is to refrain from generating the channel state information report if at least a threshold number of reference signals from the first set of reference signals is missing from the received set of reference signals, the threshold number of reference signals corresponding to the first channel state information hypothesis, or the second channel state information hypothesis, or both.

17. The method of claim 1, wherein the one or more rules indicate that the UE is to refrain from generating the channel state information report if at least one reference signal from the first set of reference signals is missing from the received set of reference signals and that the UE is to generate a plurality of channel state information reports corresponding to a remaining number of reference signals of the first set of reference signals.

18. The method of claim 1, wherein the one or more rules indicate that the UE is to refrain from transmitting an uplink channel if the UE refrains from generating the channel state information report.

19. The method of claim 1, wherein the one or more rules indicate that the UE is to transmit an uplink channel including an uplink control information or an uplink transport block if the UE refrains from generating the channel state information report.

20. The method of claim 1, wherein at least one reference signal from the first set of reference signals is missing from the received set of reference signals based at least in part on a listen before talk failure in unlicensed band, an uplink and downlink symbol conflict, a resource overlap with a downlink channel, or a combination thereof.

21. The method of claim 20, wherein the uplink and downlink symbol conflict is based at least in part on detection of at least one of a downlink control information scheduling uplink signal, a slot format indicator, an overlap between a physical random access channel occasion and a gap symbol prior to the physical random access channel occasion, or a combination thereof.

22. The method of claim 20, wherein the resource overlap with the downlink channel is determined based at least in part on a channel type, a priority of the downlink channel compared to a priority of a channel state information resource, a scheduling of the downlink channel, or a combination thereof.

23. An apparatus for wireless communications at a user equipment (UE), comprising:
at least one processor; and
at least one memory coupled with the at least one processor and storing instructions executable by the at least one processor to cause the apparatus to:
receive, from a network entity, a signal indicating a configuration for the UE to generate a channel state information report corresponding to a first set of reference signals, wherein a first quantity of channel state information processing units at the UE are associated with the first set of reference signals;
evaluate one or more rules for generating the channel state information report, wherein the one or more rules are associated with channel state information report generation for when a received set of reference signals for the channel state information report is less than the first set of reference signals; and
perform channel state information operations according to the one or more rules, wherein performing the channel state information operations occupies, in accordance with the one or more rules, a second quantity of channel state information processing units that is less than the first quantity of channel state information processing units based at least in part on the received set of reference signals for the channel state information report being less than the first set of reference signals.

24. The apparatus of claim 23, wherein the one or more rules indicate that the UE is to refrain from generating the channel state information report if none of the reference signals from the first set of reference signals are in the received set of reference signals.

25. The apparatus of claim 23, wherein the one or more rules indicate that the UE is to refrain from generating the channel state information report if at least one reference signal from the first set of reference signals is missing from the received set of reference signals.

26. The apparatus of claim 23, wherein the one or more rules indicate that the UE is to refrain from generating the channel state information report if at least a threshold number of reference signals from the first set of reference signals is missing from the received set of reference signals.

27. The apparatus of claim 23, wherein the one or more rules comprise one or more rules for calculating the second quantity of channel state information processing units for occupation at the UE, the one or more rules indicating that the UE is to calculate the second quantity of channel state information processing units as zero if at least one reference signal from the first set of reference signals is missing from the received set of reference signals.

28. The apparatus of claim 23, wherein the one or more rules comprise one or more rules for calculating the second quantity of channel state information processing units for occupation at the UE, the one or more rules indicating that the UE is to calculate the second quantity of channel state information processing units occupation based at least in part on a quantity of the received set of reference signals if at least one reference signal from the first set of reference signals is missing from the received set of reference signals.

29. An apparatus for wireless communications at a user equipment (UE), comprising:
means for receiving, from a network entity, a signal indicating a configuration for the UE to generate a channel state information report corresponding to a first set of reference signals, wherein a first quantity of channel state information processing units at the UE are associated with the first set of reference signals;
means for evaluating one or more rules for generating the channel state information report, wherein the one or more rules are associated with channel state information report generation for when a received set of reference signals for the channel state information report is less than the first set of reference signals; and
means channel state information operations according to the one or more rules, wherein performing the channel state information operations occupies, in accordance with the one or more rules, a second quantity of channel state information processing units that is less than the first quantity of channel state information processing units based at least in part on the received set of reference signals for the channel state information report being less than the first set of reference signals.

30. A non-transitory computer-readable medium storing code for wireless communications at a user equipment (UE), the code comprising instructions executable by at least one processor to:
  receive, from a network entity, a signal indicating a configuration for the UE to generate a channel state information report corresponding to a first set of reference signals, wherein a first quantity of channel state information processing units at the UE are associated with the first set of reference signals;
  evaluate one or more rules for generating the channel state information report, wherein the one or more rules are associated with channel state information report generation for when a received set of reference signals for the channel state information report is less than the first set of reference signals; and
  perform channel state information operations according to the one or more rules, wherein performing the channel state information operations occupies, in accordance with the one or more rules, a second quantity of channel state information processing units that is less than the first quantity of channel state information processing units based at least in part on the received set of reference signals for the channel state information report being less than the first set of reference signals.

* * * * *